United States Patent [19]

Friedes et al.

[11] Patent Number: 4,555,594
[45] Date of Patent: Nov. 26, 1985

[54] TELEPHONE INTEREXCHANGE SIGNALING PROTOCOL

[75] Inventors: Albert Friedes, East Brunswick, N.J.; Thomas V. Greene, Downers Grove, Ill.; Frederick W. Idenden, Colts Neck, N.J.; Kenneth L. Moeller, Naperville, Ill.; Robert M. Musen, Holmdel; John F. O'Hara, Jr., Robertsville, both of N.J.

[73] Assignee: AT&T Bell Laboratories, Murray Hill, N.J.

[21] Appl. No.: 520,112

[22] Filed: Aug. 3, 1983

[51] Int. Cl.[4] .............................................. H04M 3/42
[52] U.S. Cl. .............................. 179/18 B; 179/18 EA
[58] Field of Search ........... 179/18 B, 18 BE, 18 EA, 179/18 L, 18 FH, 7 R, 7.1 R, 7.1 TP, 8 R, 9, 10

[56] References Cited

U.S. PATENT DOCUMENTS

| 3,542,965 | 11/1970 | Wilkens, Jr. ................... 179/18 BE |
| 3,570,008 | 3/1971 | Downing et al. ................ 340/172.5 |
| 3,881,060 | 4/1975 | Connell et al. ..................... 179/5.5 |
| 4,277,649 | 7/1981 | Sheinbein ........................... 179/18 B |
| 4,464,543 | 8/1984 | Kline et al. ......................... 179/8 R |

OTHER PUBLICATIONS

*Bell System Technical Journal,* vol. XLIII, No. 5, Parts 1 and 2, Sep. 1964.
*Notes on the Network,* Issue 2, Dec. 1980, (Bell System Practices, AT&T Co. Standard).
B. J. Yokelson, "A New Multifrequency Receiver", *Bell Laboratories Record,* Jun. 1954, pp. 221-225.

*Primary Examiner*—Thomas W. Brown
*Attorney, Agent, or Firm*—David Volejnicek

[57] ABSTRACT

Disclosed are schemes for selecting an interexchange telephone call carrier, selecting a route to the selected carrier, and establishing a call path on the selected route to the selected carrier in a multicarrier environment. Call path establishment from an end office at which a call is originating to the carrier's office is accomplished via a multifrequency signaling scheme. If the call is an international call or the route is an indirect route to a carrier via an access tandem, following seizure of a trunk the end office outpulses thereon a first sequence of information that characterizes the subsequent route that the call should take, including identity of the interexchange or international carrier. After receiving a wink responsive to the first sequence, the end office outpulses a second sequence. If the call is a domestic call routed directly to a carrier, following seizure of the trunk the end office begins outpulsing with the second sequence. The second sequence generally contains information characterizing the source of the call, such as information on the class of service of the calling terminal and possibly Automatic Number Identification (ANI) code. Following the second sequence, the end office outpulses a third sequence of information characterizing the destination of the call, i.e., the called number, if such information is available. The end office then awaits receipt of an acknowledgment wink indicative of receipt by the interexchange carrier of the second and selectively the third sequences. Upon receiving the acknowledgment wink, the end office cuts-through the call path to the trunk.

66 Claims, 19 Drawing Figures

FIG. 9A

| | SCRATCHPAD | | | | 512 |
|---|---|---|---|---|---|
| 1st WORD | XXX 671 | DEFAULT RLO 672d | DEFAULT RLS 673d | DEFAULT RLI 674d | 901 |
| 2nd WORD | XXX 671 | RLO 672d | RLS 673b | 0 | 902 |
| 3rd WORD | XXX 671 | RLO 672d | RLS 673b | RLI 674d | 903 |

FIG. 9B

| | SCRATCHPAD | | | | 512 |
|---|---|---|---|---|---|
| 1st WORD | XXX 671 | DEFAULT RLO 672d | DEFAULT RLS 673d | DEFAULT RLI 674d | 901 |
| 2nd WORD | XXX 671 | RLO 672d | RLS 673d | 0 | 902 |
| 3rd WORD | XXX 671 | RLO 672d | RLS 673d | RLI 674d | 903 |
| 4th WORD | XXX 671 | RLO 672d | RLS 673c | RLI 674d | 904 |

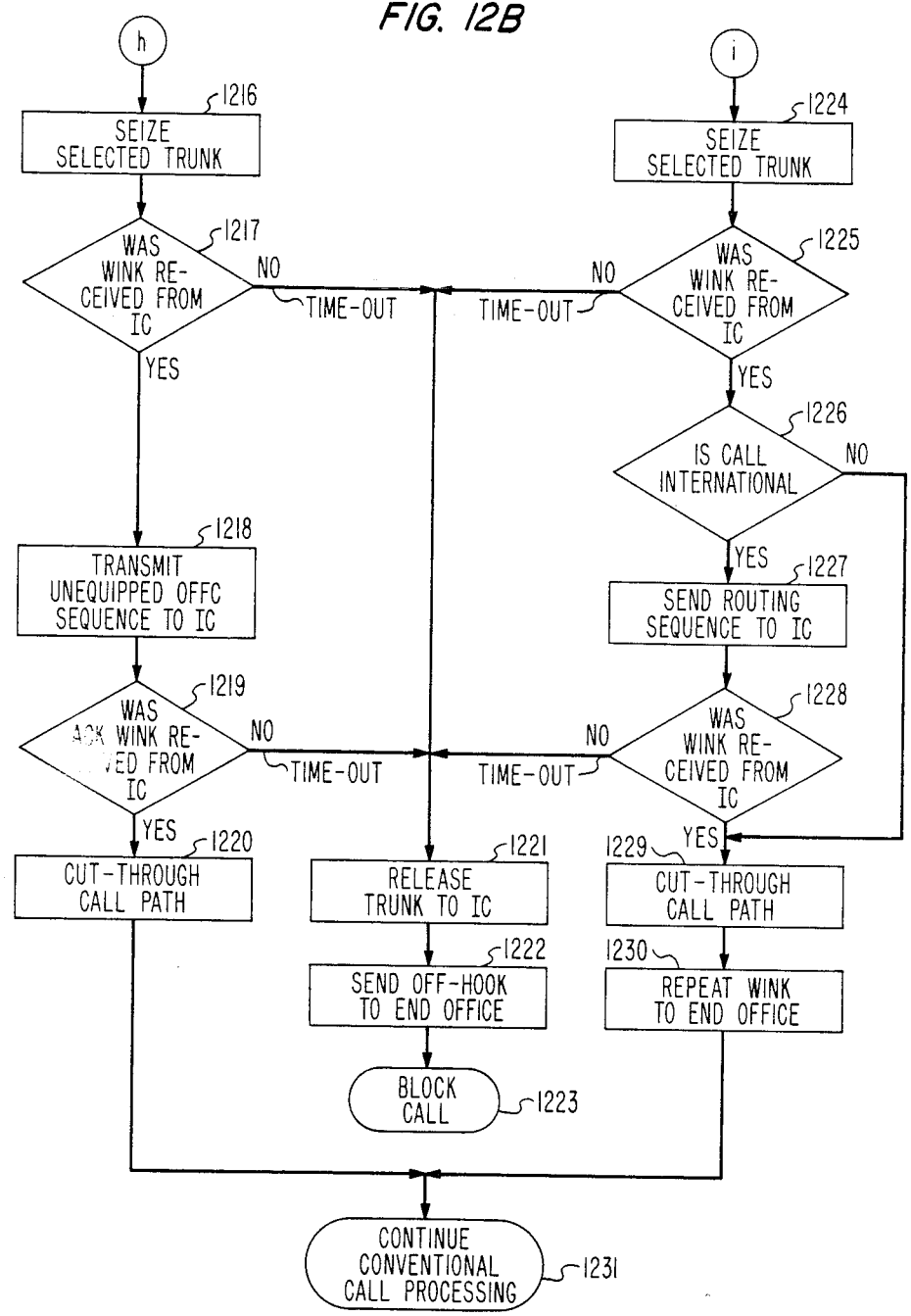

TELEPHONE INTEREXCHANGE SIGNALING PROTOCOL

CROSS-REFERENCE TO RELATED APPLICATIONS

Concurrently filed herewith and assigned to the same assignee as this application are: application of D. H. Riley, entitled "Telephone Interexchange Carrier Selection", Ser. No. 519,851; and application of B. R. Bimonte, M. A. Gauldin, and D. H. Riley, entitled "Telephone Interexchange Call Routing", Ser. No. 519,841.

The related applications share a substantially common disclosure with this application but their claims are directed to different aspects of that disclosure.

TECHNICAL FIELD

This invention relates to communication call routing in a multi-carrier environment in general, and to the selection of an interexchange call carrier and the routing and connection of a call to the selected carrier in particular.

BACKGROUND OF THE INVENTION

For purposes of telephone communications, a geopolitical area, such as the United States, is divided into a plurality of contiguous, non-overlapping districts, called exchanges, each of which is served by a local telephone company. In telephony parlance, the exchanges are also referred to as Local Access Transport Areas (LATAs). Telephone calls originating and terminating within the same exchange, referred to as intraexchange calls, are generally handled end-to-end by a local, intraexchange, telephone company. Calls originating within one exchange or in a foreign country and terminating in a different exchange or in a foreign country, referred to as interexchange calls, are handled at each end by the intraexchange company that services the originating or the terminating exchange, and the calls are carried between the intraexchange companies by one or more interexchange carriers.

A plurality of alternative interexchange carriers have come to be available to callers to carry their interexchange calls. It is therefore necessary to provide callers with the capability of selecting interexchange carriers, and to provide interconnection between callers and the selected interexchange carriers. Furthermore, it is desirable to provide interconnection between any caller and any interexchange carrier on the same type of a basis.

The conventional scheme of providing interconnection between callers and carriers has not completely satisfied the objective of providing interconnection to all carriers on an equal basis. Traditionally, to have their interexchange calls completed and carried by one interexchange carrier, callers have merely had to dial the number of the called party. However, to have their interexchange calls carried by other interexchange carriers, the callers have had to dial access codes assigned to those carriers. Dialing of the access code has provided the callers with connection to the selected carrier, and the callers then have had to dial a personal identification code and only then the number of the called party, to have the call completed.

Additionally, an intraexchange telephone company has typically been able to transfer interexchange calls to one interexchange carrier over various routes, as a function of certain parameters that are associated with each call, such as the class of service of the call-originating equipment and the called number. Alternative interexchange carriers have generally not been provided with this capability in an efficient manner and they have had to receive calls of all types over a single type of route.

Furthermore, the intraexchange telephone companies have conventionally been able to keep various records and to perform various servicing activities on calls routed via an interexchange carrier, and therefore the protocol for communications between switching offices of the local telephone companies and of the carrier has not had to provide for transfer of information necessary to make these records and to perform these activities. But the protocol has been found lacking in capabilities to communicate the requisite information from the local telephone companies to the carriers to enable the carriers to keep their own records on, and to provide services for, calls routed to them. And while conventionally a switching office could assume that information sent by it to a carrier office was properly received, a need has arisen for determining that sent information has actually been received. But the conventional interoffice communication protocol has been found lacking in capabilities for determining whether the carrier office has received the communicated information.

SUMMARY OF THE INVENTION

The invention is directed toward eliminating such and other inadequacies of the prior art. According to an aspect of the invention, establishment of a call communication path between telephone switches includes transferring an acknowledgment signal from a second switch to a first switch in response to a transfer from the first switch of information characterizing the call, to which acknowledgment signal the first switch responds by connecting the call to a selected path leading to the second switch.

More particularly, the transfer of information characterizing the call may include a transfer of a first sequence of information characterizing the source of the call and optionally identifying the source of the call, and a selective transfer of a second sequence of information characterizing the destination of the call.

Selectively, the transfer of information characterizing the call involves a transfer of a first set of information characterizing the call, which information preferably characterizes the route of the call from the second to yet another switch. A transfer of a responsive signal from the second switch to the first switch follows. It is in turn followed by a transfer from the first switch on the selected path of a second set of information characterizing the call.

Advantageously, the above-described inventive scheme supplements well the conventional multifrequency interoffice signaling scheme used for call path establishment and facilitates the transfer between a carrier switching office and an intraexchange telephone company switching office of information which is required by these offices for properly servicing the call. The transfer of information characterizing the call, or even identifying the source of the call, allows the recipient of this information, such as a carrier switch, to properly route, bill, and otherwise service the call. In particular, information characterizing the source of the call may give the recipient thereof information about the class of service of the call-originating equipment, and may provide adequate equipment-identifying information, such as the calling directory number, to allow the calling equipment to be uniquely identified. Such information may be used by the recipient for performing screening on the call, for determining what special services to provide for the call, for selecting the subsequent route, if any, for the call, and for billing the call to the call-originating equipment.

Information about destination of the call, such as the called number, allows the recipient of the information to select and set up a route for the call to the call destination even before the caller is connected to the recipient switch and without the recipient switch having to request this information of the caller. Thus all carrier switches are enabled to complete calls on the same basis. And information characterizing the route of the call from the second to yet another switch—such as a carrier identification code, a code conveying information about the class of service of the calling number and/or the calling number, and possibly a code conveying general information about the destination of the call such as a country code—allows the call to be routed to the other switch in a versatile manner, i.e., on the basis of a plurality of factors, and on an equal basis to all switches.

Overall, the scheme allows a selected communication path to be established on an equal basis to all carriers, and provides any carrier with the option of receiving on an equal basis information required by it to properly service calls on its own. The switch of any carrier is enabled to service the call in the same manner, on the basis of the same information, and without appearing any different to a caller, than the switch of any other carrier.

Furthermore, the inclusion of an acknowledgment signal in the above-described scheme unequivocally informs the recipient thereof that the sender of the acknowledgment signal has received the information being acknowledged, and hence that the call path is ready for completion. The recipient of the acknowledgment signal no longer has to rely blindly on the integrity of the signaling path leading to the sender of the acknowledgment and on the ability of the acknowledgment sender to receive the information being acknowledged. The acknowledgment signal replaces a possibly-unfounded assumption that the information was received with a positive indication that the information was received by the sender of the acknowledgment. Reliability of interoffice communications is thus improved. Additionally, the acknowledgment signal may be utilized by the recipient thereof for other purposes as well, for example, for indicating whether or not the recipient of the acknowledged information should be billed for the call.

These and other advantages and features of the invention will become apparent from the following description of an illustrative embodiment of the invention, taken together with the drawing.

BRIEF DESCRIPTION OF THE DRAWING

FIGS. 9A and 9B are logical-layout diagrams of the scratch pad of FIG. 5;

FIGS. 12A and 12B present a logical-flow diagram of access tandem call processing.

DETAILED DESCRIPTION

Figure 1:
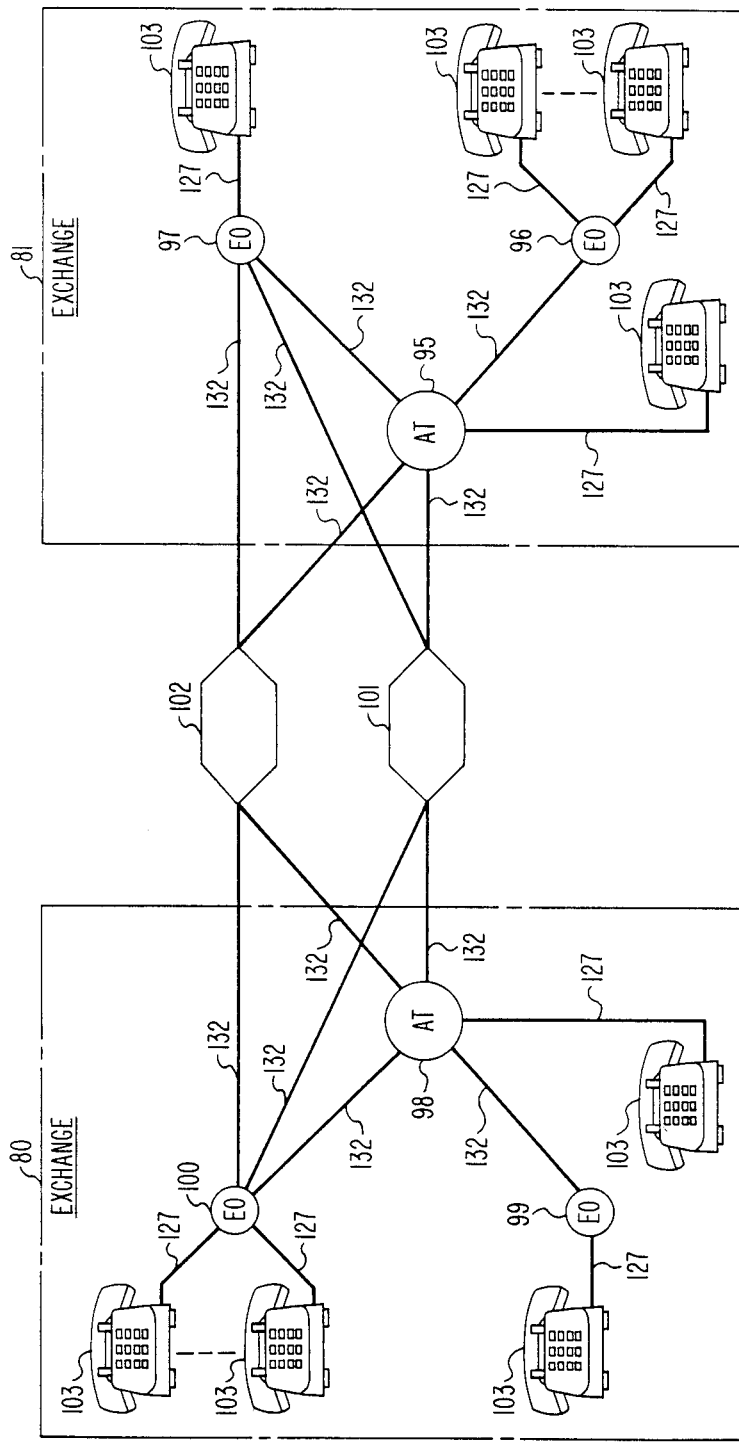
FIG. 1 is a simplified block diagram of a telephone network.

The invention is situated within the environment of a telephone network. FIG. 1 illustrates a simplified version of a representative telephone network. The details of conventional configuration and operation of an illustrative network of this nature are described in *Notes on the Network*, Issue 2, published in December 1980, by American Telephone and Telegraph Company. Reference may be made to this publication for a detailed understanding of the conventional features of the telephone network.

For purposes of such a network, a geopolitical area served by the network, comprising, for example, the United States and perhaps other countries, is divided into a plurality of contiguous, non-overlapping geographical areas called exchanges, represented in FIG. 1 by the exchanges 80 and 81. The telephone communication needs of each exchange are served by a local, intraexchange, telephone operating company. Within each exchange, the intraexchange company provides switching offices for routing calls to their destinations. For example, in exchange 80, one intraexchange company provides switching offices 98, 99, and 100, while in exchange 81 another intraexchange company provides switching offices 95, 96, and 97.

Interoffice communication routes are provided by trunks 132. While for clarity only individual trunks 132 are indicated in FIG. 1, typically two switching offices are interconnected by one or more groups of trunks 132 aptly referred to as trunk groups. The trunks 132 are assigned to trunk groups on the basis of their characteristics, such that the trunks 132 in a trunk group share some common characteristic, for example, a similar signaling scheme.

Subscribers to an intraexchange company's services have their stations connected to the various switching offices of the operating company. For example, subscriber stations 103 in the exchange 80 are connected to the offices 98, 99, and 100, while subscriber stations 103 in the exchange 81 are connected to the offices 95, 96, and 97. The subscriber stations 103 may comprise a wide variety of equipment. A station 103 may be, for example, a conventional telephone set, a pay telephone, a private branch exchange (PBX), or a Centrex telephone. Station-to-office connection is via lines and trunks, which will be commonly referred to herein as terminal links 127 to distinguish them from interoffice trunks 132.

Intraexchange calls in each exchange are commonly handled end-to-end by the switching offices of the intraexchange company. Interexchange telephone calls are handled at each end by the intraexchange operating companies of the respective exchanges, but they are carried from one exchange to the other by an interexchange carrier (IEC). A plurality of interexchange carriers may exist and each may provide its own switching office and transmission facilities to interconnect the exchanges. In the example of FIG. 1, one interexchange carrier provides switching office 101 to interconnect the exchanges 80 and 81, while a second interexchange carrier provides a switching office 102 for that purpose. Furthermore, each interexchange carrier may provide more than one switching office to service a given exchange. Connection of intraexchange company offices to the interexchange carrier offices is likewise via trunks 132.

If the exchanges 80 and 81 lie in different countries, the interexchange carriers that interconnect them are more specifically referred to as international carriers (INC). Because the following discussion applies to both domestic interexchange and international carriers and because a single carrier can be both a domestic and an international carrier, both will be understood to be included in the term "interexchange carrier", or just "carrier" (IC). Where discussion applies to international carriers specifically, the term "international carrier" will be used.

Intraexchange switching offices that merely switch communication paths between terminal links 127, and between trunks 132 and terminal links 127, are referred to as end offices (EO). In the example of FIG. 1, offices 96, 97, 99, and 100 are end offices. Certain end offices, such as the offices 97 and 100, have direct trunk 132 connections to carrier offices 101 and 102. Other end offices, such as the offices 96 and 99, only have indirect connections to carrier offices 101 and 102 via other offices such as the offices 95 and 98, respectively, of the respective intraexchange company. The offices such as the offices 95 and 98 that interface, i.e., provide access between, end offices and carrier offices are referred to as access tandems (AT). Access tandems may likewise service subscriber stations as do the end offices, and hence discussion of end offices will be generally understood to pertain as well to the access tandems acting in an end office capacity.

Because there may be more than one carrier available to a telephone subscriber to carry his interexchange calls, each subscriber can, but is not required to, identify a carrier as that subscriber's primary interexchange carrier (PIC). The primary carrier may be an interexchange carrier only, an international carrier only, or a combined interexchange and international carrier. Presubscription to, i.e., predesignation of, a primary carrier may be done by a subscriber on a per-line basis, for example when the subscriber's station 103 is a conventional telephone or an individual Centrex telephone; on a per-line group basis, for example when a subscriber's group of stations 103 comprise Centrex telephones; or on a per-trunk group basis, for example when the subscriber's station is a PBX.

Though identifying a primary carrier is not mandatory, such designation is necessary if the customer wishes to use conventional dialing, for example the 7 or 10 digit dialing of a domestic called number on a conventional telephone, to reach a carrier, other than a default carrier, if optional provision for designating a default carrier has been made and a default carrier has been defined. A default carrier can be one that has optionally been designated by an intraexchange office to carry an interexchange call for which no carrier has been designated. An office can designate a default interexchange carrier and a separate default international carrier.

A subscriber's designation of a primary carrier is accomplished via a service order of a conventional type. The service order is entered in a conventional manner by the intraexchange-company service personnel into the switching office's data base. In the data base, the primary carrier designation is stored along with other conventional information pertaining to the subscriber and the subscriber's telephone equipment.

A subscriber further has the option of designating a carrier for any particular call by dialing a carrier identification (ID) code as a prefix to the called number. The carrier ID is a set of digits, and it could be any predetermined number of digits; for example, two or three digits could be used for this purpose. While conventionally two digit identification codes have been assigned to carriers, in this illustrative example it is assumed that three digits are generally used for carrier ID. The carrier ID code is hereinafter identified as XXX.

Since the scheme of dialing a carrier identification code may be universally used to identify any carrier, a "no presubscription" option may be implemented that requires the calling party to specify the desired carrier on a call-by-call basis by dialing the carrier ID as a prefix to the called number. However, the illustrative embodiment here described assumes that the subscriber is always allowed to presubscribe to a carrier.

Optionally, a subscriber may also be allowed to select a carrier for his interexchange calls via the conventional scheme of dialing 950-1XXX, where the three digits XXX identify the desired carrier. The XXX codes may include the 0XX codes currently used in 950-1XXX dialing. This current scheme is modified to expand to 950-1XXX dialing so as to achieve consistency in the number of ID's available for carrier identification.

Figure 2:
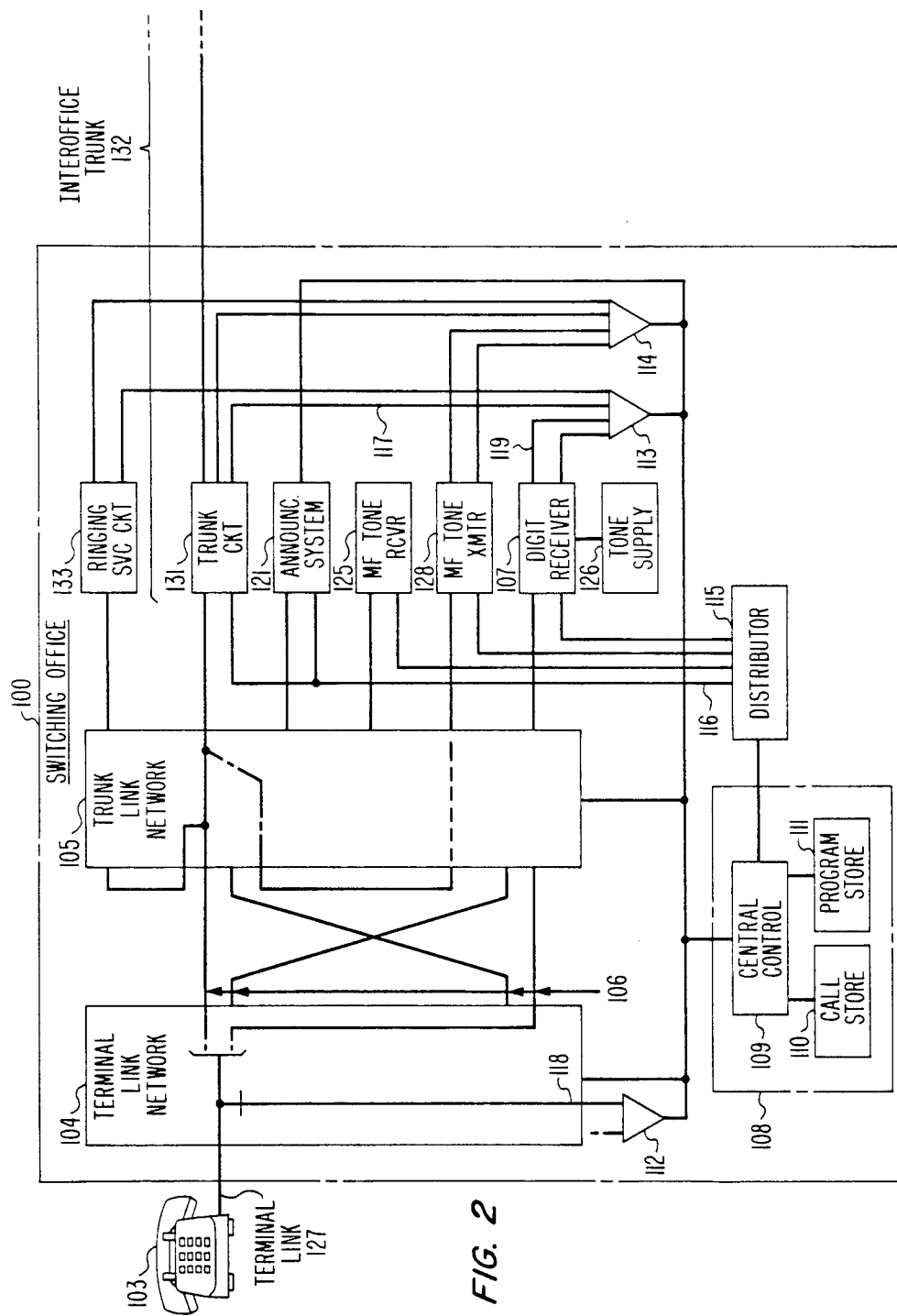
FIG. 2 is a block diagram of a switching system portion of the telephone network of FIG. 1.

FIG. 2 shows a block diagram of a typical portion of the switching network of FIG. 1 comprising switching office 100. By way of example, each of the switching offices of the network is suitably a program controlled electronic-switching office of the type disclosed in U.S. Pat. No. 3,570,008 to R. W. Downing et al. of Mar. 9, 1971, and also disclosed in Bell System Technical Journal, Vol. XLIII, No. 5, Parts 1 and 2 September, 1964. These citations may be referred to for a more comprehensive understanding of the construction and conventional operation of the switching office, but a brief description will be given herein to illustrate how the invention functions within the switching office.

The end switching office 100 comprises a terminal-link network 104, a trunk-link network 105, and a stored-program-controlled processor 108. The terminal-link network 104 provides the termination for terminal links 127 of subscriber stations 103. The trunk-link network 105 provides terminations for the interoffice trunks 132 which terminate at the switching office 100 via trunk circuits 131. The trunk-link network 105 also provides terminations for miscellaneous other circuits such as digit receivers 107, multifrequency (MF) tone transmitters 128, MF tone receivers 125, ringing-service circuits 133, and an announcement system 121. The terminal link and trunk-link networks 104 and 105 are connected via junctors 106 to permit the interconnection of terminal links 127, trunks 132, and service circuits for call processing under the control of the processor 108.

The majority of the logic, control, storage, supervisory, and translation functions required for the operation of this system are performed by the central processor 108. The processor 108 is a data processing facility and can be functionally divided into a central control 109, a call store 110, and a program store 111, plus maintenance apparatus which has not been shown to simplify the drawing. The call store 110 is a memory for storing information relating to calls in progress and special services. This information includes the busy/idle status of circuits, digits received and to be transmitted on various calls, the supervisory states of circuits, special screening information, etc., as will be selectively described in more detail below. The call store 110 may also store a data base of translation information. In the present example, the program store 111 stores the data base of translation and routing information in addition to the program instructions which direct the central control 109 to sequentially perform its many functions.

The central control 109 is the information processing unit of the system and executes the program instructions listed in the program store 111, using data stored in the call store 110 and the program store 111.

The processor 108 interfaces with terminal links 127, trunks 132, and service circuits via scanners 112, 113, and 114 and a distributor 115. The distributor 115 responds to an order over a bus system from the central control 109 to apply pulses to distribution points connected to the peripheral equipment. For example, in response to the appropriate order, the distributor 115 signals over a conductor 116 to actuate apparatus such as a relay in a trunk circuit 131.

Scanners 112, 113, and 114 are used to gather information for the central control 109 by monitoring leads connected to the various peripheral units. Thus, when a trunk circuit 131 changes state as a result of a seizure from a distant originating office, a signal is transmitted via a conductor 117 to the scanner 113. Similarly, the scanner 113 recognizes changes of state in a digit receiver 107 via a conductor 119 in order to ascertain digits received from terminal links 127 or trunks 132. Periodically, the scanners 112-114 are addressed by the central control 109 over a bus system to ascertain any changes of state in the peripheral units. The end offices 96, 97, and 99 shown in FIG. 1 are equivalent to the office 100.

The carrier switching offices 101 and 102 shown in FIG. 1 are equipped to switch calls between trunks 132. These offices basically comprise the same units of equipment as the switching office 100, with the exception that the terminal-link network 104 is not needed and it may be either removed or replaced by a second trunk-link network, equivalent to the trunk-link network 105, with associated peripheral equipment. And access-tandem switching offices 95 and 98 are hybrids of an end office and a carrier office, they are equipped to switch calls between trunks 132 as well as between terminal links 127. These types of switching offices are well known in the art and need not be described in detail herein.

The conventional operation of the system of FIGS. 1 and 2 is described in the issue of the Bell System Technical Journal referred to above. Therefore only the operational characteristics that deviate from the conventional scheme will be considered next. In considering initially the operation of a switching office acting as in the capacity of an end office, for example the end office 100, reference will initially be made to the logical-flow diagram of FIG. 3. This figure represents functions performed by the end office 100. The end office 100 scans incoming terminal links 127 for off-hook indications from associated subscriber stations 103 in a conventional manner, by means of scanner 112. As suggested in blocks 300 and 301 of FIG. 3, the detection of an off-hook signals initiation of a telephone call and causes the end office 100 to set itself up, in a conventional manner, to process the call. Setting up includes identifying the terminal link 127 on which the call is originating, and performing translation to determine characteristics of that terminal link 127, such as class of service, features, restrictions, type of signaling, etc. To obtain this information, access is made in the data base to an Office Equipment (OE) relation 411 (see FIG. 4) that is associated with the originating terminal link 127. The OE relation 411 is a conventional data base construct which stores information about the characteristics and features of the originating terminal link 127.

Figure 5:
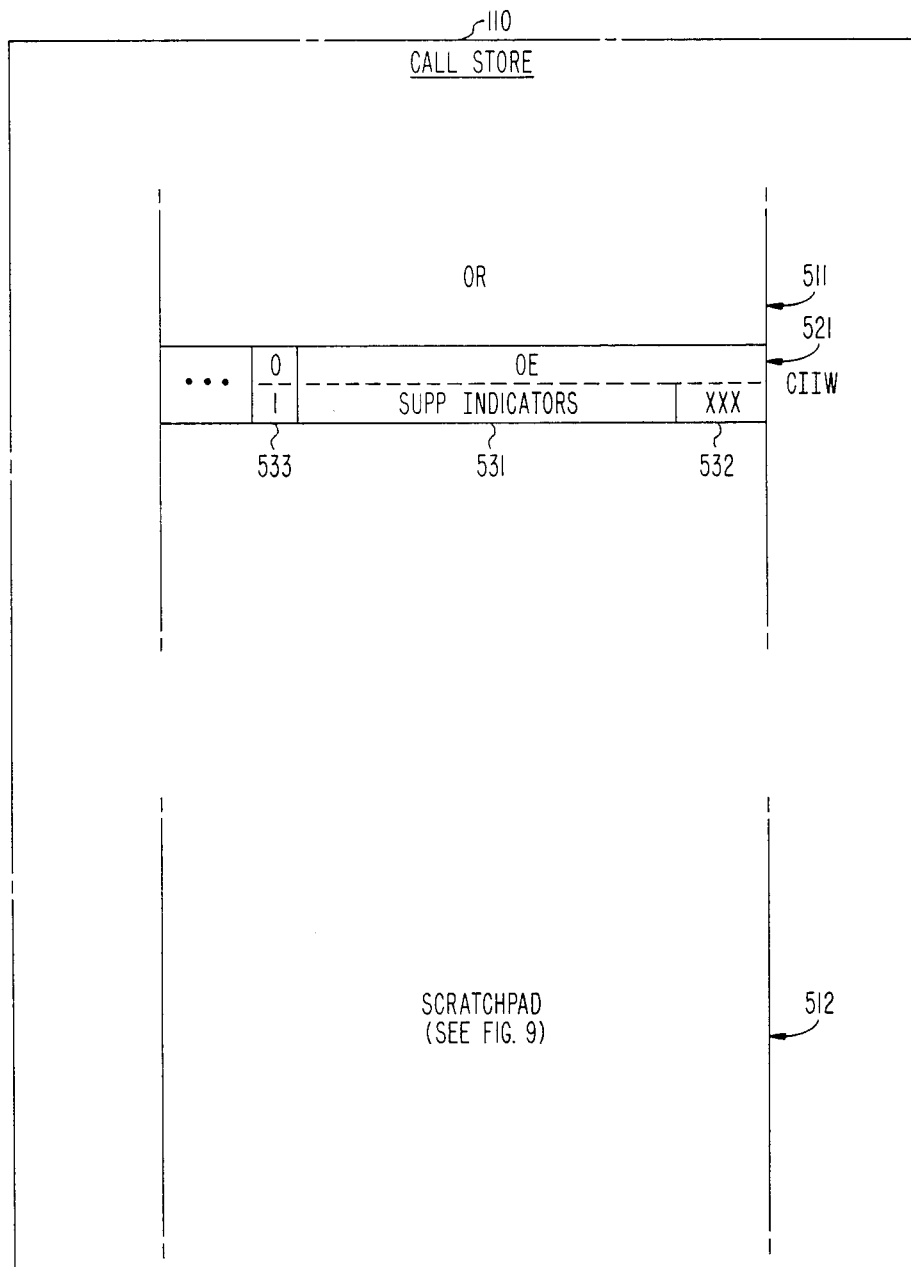

Setting up activities further include connecting an appropriate digit receiver 107 to the calling terminal link 127 to receive and collect dialed digits, allocating an Originating Register (OR) 511 (see FIG. 5), of the call store 110 to aid in the subsequent processing of the call, and sending a start-dial signal, e.g., dial tone, from a tone supply 126 to the terminal link 127. Also, as indicated in block 302 of FIG. 3, an identification number for the originating terminal link (OE) is saved in fields 531-532 of a memory word, referred to as a Carrier Interconnection Identification Word (CIIW) 521, of the Originating Register 511 (see FIG. 5). And a marker 533 of the CIIW 521 is set to zero to indicate presence of the OE identification in the CIIW 521.

Digit collection is then initiated, and the first two collected digits are examined to determine whether they are one and zero ("10"), as indicated in block 304. The "10" is a prefix, a code, signifying that the next set of dialed digits identifies an interexchange carrier.

If "10" prefix has not been dialed, as the determined in the block 304, the office proceeds with further digit collection and digit analysis in a conventional manner, as suggested in block 310.

If the "10" prefix has been dialed, a check is made to assure that the 10XXX code has not been dialed erroneously more than once, as indicated in block 305. If an error has occurred, steps are taken in a conventional manner to block the call, as indicated in block 306. These steps may, for example, include returning an appropriate message to the caller, such as one informing the caller of the particular dialing error and requesting the caller to hang up and then try the call again.

As suggested in block 307, if the check at the block 305 determines that the 10XXX code has not yet been dialed, the data base is accessed and supplemental information about the originating terminal 127 link is determined and stored.

Figure 4:
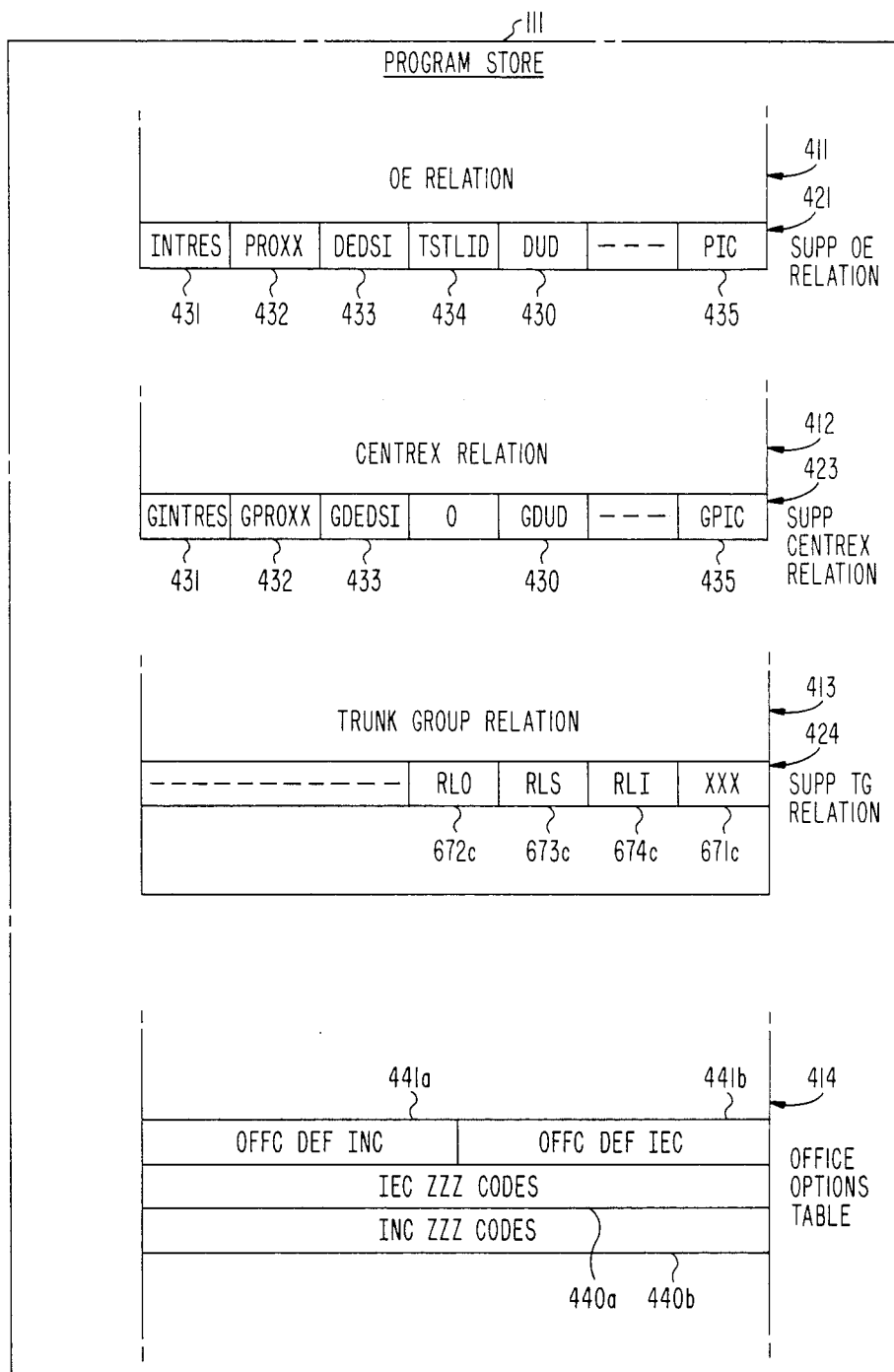
FIGS. 4-7 are logical-layout diagrams of data structures of the switching system of FIG. 2.

As shown in FIG. 4, the supplemental information about terminal link 127 is retrieved from a word of memory, referred to as the Supplemental OE relation 421, that is associated with the OE relation 411 described previously. The Supplemental OE relation 421 in this instance comprises a plurality of indicators that indicate the interexchange call characteristics of the call-originating terminal link 127. The indicators specify, for example, whether the calling terminal link 127 is restricted from dialing 10XXX codes (PROXX 432), whether the calling terminal link 127 is restricted from dialing any interexchange calls (INTRES 431), whether the calling terminal link 127 is classified as a "deadbeat" (DEDSI 433) for nonpayment of telephone bills to a carrier for whom the end office is doing billing, whether the originating equipment is a test line (TSTLID 434) and, optionally, whether a default carrier may be used if no primary, predesignated, interexchange carrier exists (DUD 430). The supplemental information also includes a field (PIC 435) that identifies the primary interexchange carrier, if one exists, that has been predesignated by the subscriber. The supplemental information that is derived from the data base relation 421 is stored in the CIIW 521 of the originating register 511 (see FIG. 5), supplementing therein the originating-terminal link identification.

In the instance where the terminal link 127 is a Centrex telephone line, an additional relation, referred to as a Centrex relation 412, is associated with the calling terminal link 127 and other terminal links of the same Centrex group. The Centrex relation 412 also has associated therewith supplemental information about the interexchange call characteristics of this group of Centrex lines, referred to as a Supplemental Centrex relation 423. The Supplemental Centrex relation 423 is substantially like the Supplemental OE relation 421, with the exception that it has no test line indicator TSTLID 434, i.e., the field 434 is null, and that its carrier identification field, GPIC 435, identifies the primary interexchange carrier, if any, that has been predesignated for the whole group of Centrex lines. While not manipulated at this point, later on the information contained in the Supplemental Centrex relation 423 will be retrieved and stored in scratch pad memory for use in conjunction with the information contained in the Centrex terminal links Supplemental OE relation 421, as will be made clear in the discussion of block 837 of FIG. 8.

Figure 3:
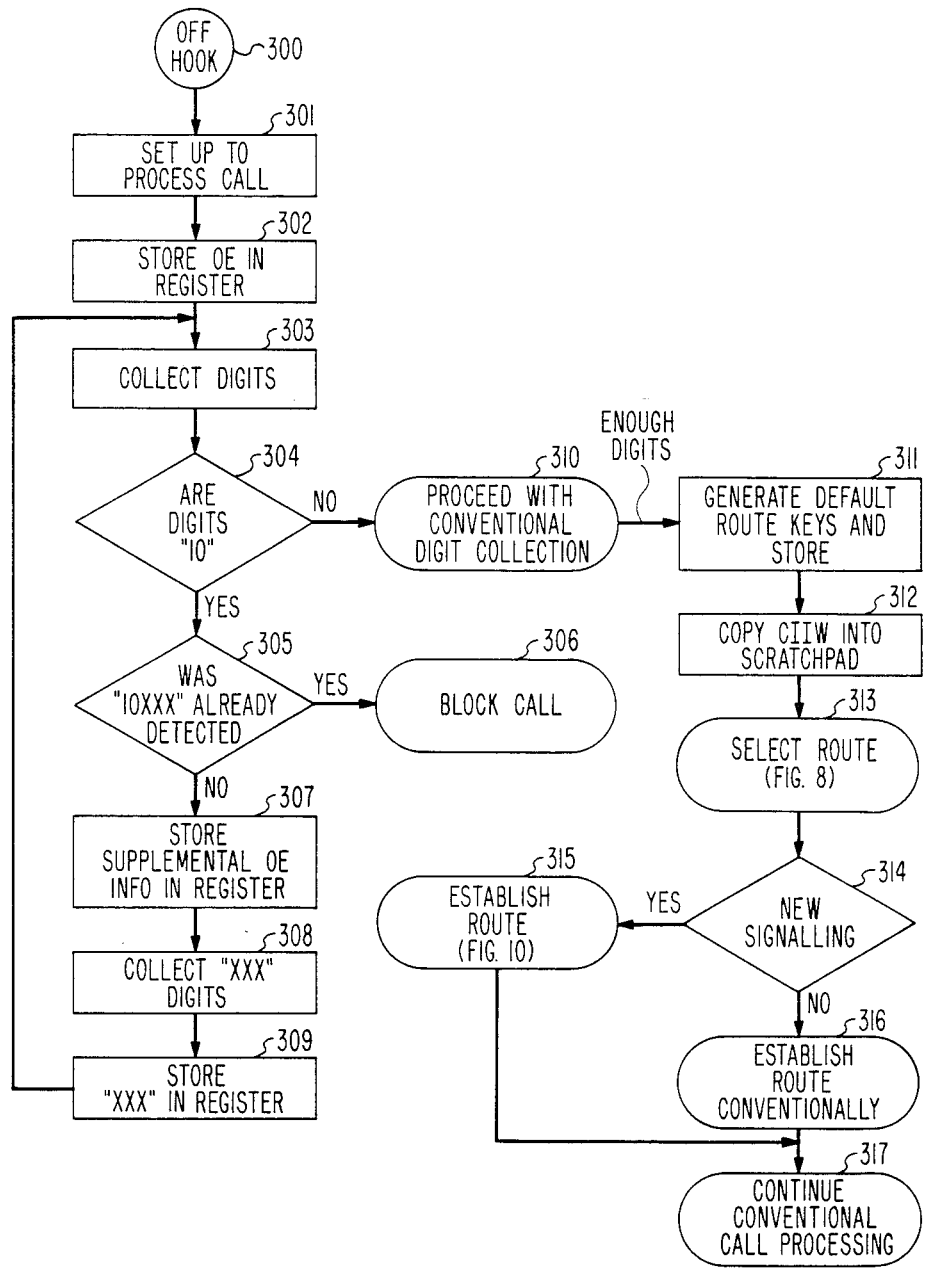
FIG. 3 presents a logical-flow diagram of end office call processing.

Returning to consideration of FIG. 3, if the test in the block 305 does not indicate prior detection of the 10XXX code, more dialed digits are collected, as indicated in block 308. These digits are the XXX code identifying a carrier. As indicated in block 309, they are loaded into the field 532 of the CIIW 521 of the originating register 511 to overwrite therein the previously-saved information, and the marker 533 of the CIIW 521, is raised to denote the presence of the XXX code and the supplemental OE indicators.

Logically, operation is then returned to the collection of dialed digits, as at the block 303. Unless an error occurs, the next two dialed digits are not found to be "10" at the block 304 and therefore digit collection proceeds in a conventional manner at the block 310.

When a sufficient number of digits are collected by the digit receiver 107 at the block 310, steps are taken to find a route through the switching system for the call. The sufficiency of the number of digits is determined in a conventional manner by analyzing the digits as they are received. As indicated in block 311, keys comprising identifiers of a fallback, default, route are generated, and stored in a scratch pad 512. The scratch pad 512 is a portion of the call store 110 that is associated with a call while it is in progress (see FIG. 5). Keys are conventional data base structures that serve as pointers into the data base. As indicated in block 312 of FIG. 3, the contents of the CIIW 521 are retrieved and also are stored in the scratch pad 512, to make them available for use by the route selection process. Selection of an actual route for the call is then undertaken, as indicated in block 313. These steps are expanded upon in the following discussion.

The digits and other data about the call are processed to derive information for routing the call. The processing typically is begun on the first three digits that form the office code, plus any preceding dialed area-code or access-code digits. Access-code digits are, for example, zero for operator-assisted domestic calls, one for long-distance domestic calls, zero-plus-one-plus-one (011) for international direct-dialed calls, and zero-plus-one (01) for international operator-assisted calls. They are generally referred to herein as prefixes to the called number. The access-code digits follow a 10XXX code if a 10XXX code is dialed. Digit analysis determines the meaning of the various digits and the number of digits to be expected. Digit processing may begin while digits other than those utilized in the processing are being received; alternatively, processing may begin only after all digits have been received.

Before explaining the process of route selection, it is necessary to define the data base structures that are utilized by that process. These data base structures are diagrammed in FIGS. 6 and 7, and reference is made to these Figures in the following discussion.

Figure 6:
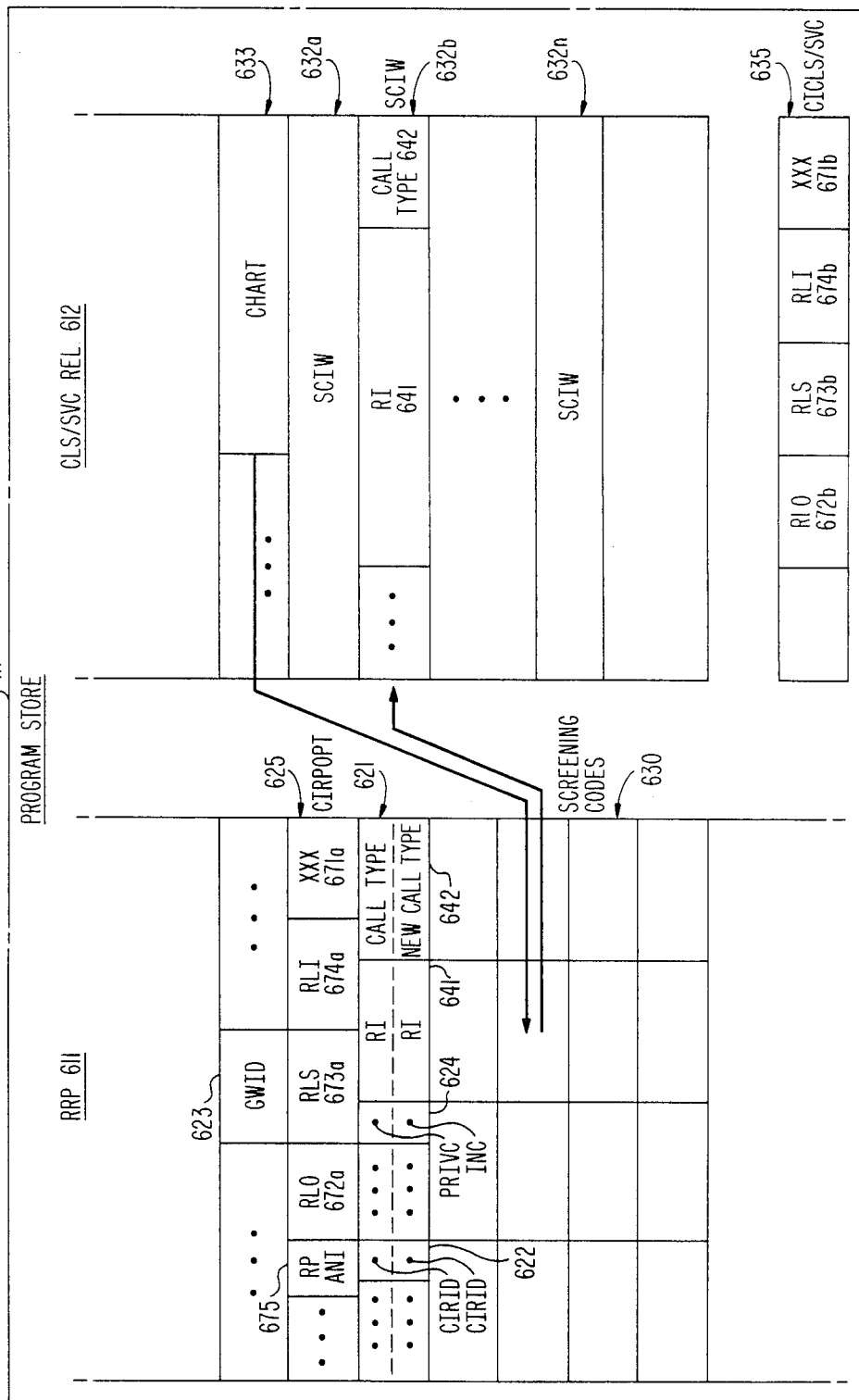

A portion of the processing is conventional digit translation. The conventional digit translation involves accessing in the data base a relation, referred to as a Rate and Route Pattern (RRP) 611, (see FIG. 6) that is associated with the digits that are being translated, to retrieve therefrom routing and other information. The retrieved information is stored in the scratch pad 512 of the call memory 110 for use by data base processing. Referring to FIG. 6, the routing information contains a route descriptor 621, including a conventional Route Index (RI) 641 that specifies a trunk group over which the call may be routed. This route descriptor 621 is generally used for routing certain calls, such as intraexchange calls and interexchange calls that are not handled by an interexchange carrier.

Other items of information included in the route descriptor 621 include an indicator, referred to as the Carrier Interconnection Route Indicator (CIRID) 622, which indicates whether the associated code is an interexchange code; also included is a CALL TYPE indicator 642, which indicates the type of call of the associated code, including whether or not it is of a new type, as will be explained further below. As shown in FIG. 6, the route descriptor 621 also includes a field 624 whose meaning varies, depending upon whether the CALL TYPE indicator 642 indicates the new call type. If the indicator 642 indicates the new call type, then the indicator 624 indicates whether the call code is domestic or international (INC). If the indicator 642 does not indicate a new call type, then the indicator 624 indicates whether the associated code is a privileged code (PRIVC) entitled to special routing. For example, a privileged code may be an interexchange code that is being routed as an intraexchange code.

The Rate and Route Pattern 611 may also include an entry referred to as a Carrier Interconnect Rate and Route Pattern Option (CIRPOPT) 625, that specifies information for use in routing a call to the associated code via an interexchange carrier. The CIRPOPT 625 generally exists only for special service access codes, such as for "800" type of codes. The information contained by CIRPOPT 625 will be described in more detail further below. Furthermore, the Rate and Route Pattern 611 contains an International Gateway Identifier (GWID) 623 which, if not zero, indicates that calls to the associated code may be routed via an international carrier, i.e., that the code is an international excepted code, even though the call code is not international. The Rate and Route Pattern 611 also contains a list of screening codes 630 that define conventional screening that may be applicable to the associated code. Other indicators, not of direct concern to this discussion, may also be stored in the Rate and Route Pattern 611.

The conventional digit translation also involves accessing in the data base another relation, referred to as a Class of Service (CLS/SVC) relation 612, that is associated with the class of service (CLS/SVC) to which the originating terminal link 127 has been assigned, to retrieve therefrom a pointer, referred to as a chart 633, which enables the selection of a particular one of the screening codes 630 in the Rate and Route Pattern 611. The selected one of the screening codes 630 in turn serves as a pointer into the Class of Service relation 612 to select therein one of a plurality of words, referred to as Supplementary Call Identification Words (SCIW) 632, which may supplement or modify the route descriptor 621 obtained from the Rate and Route Pattern 611 in order to provide for customized treatment of the dialed code on a per-terminal link 127 basis. Associated with the Class of Service relation 612 is a word of memory, referred to as CICLS/SVC 635 that specifies information for use in routing a call from terminal links 127 of the associated class of service via an interexchange carrier. The information contained by CICLS/SVC 635 will likewise be described in more detail further below.

Most interexchange calls, identified by the CIRID 622, and other calls that are routed to interexchange carriers, are not generally routed according to the route descriptor 621 obtained via the conventional translation. Rather, these calls are routed according to data obtained from data base data relations, referred to as Route Lists 750 (see FIG. 7). A Route List 750 is a list of routes that share some common characteristic. Route List 750 routing provides the capability of routing a call to an interexchange carrier via one of several possible trunk groups, based on the characteristics associated with the call. An interexchange carrier therefore may specify what types of calls will be sent to it via which trunk group.

The characteristics of a call, on the basis of which a route may be selected at an end office, are generally the following: identity of the carrier designated to carry the call, i.e., the XXX code; the dialed prefix, if any, such as "1" for a domestic long-distance call, "0" for an operator-assisted domestic call, "011" for an international direct-dialed call, or "01" for an international operator-assisted call; the class of service of the originating equipment, such as coin or coinless public phone terminal link, multiparty phone terminal link, hotel or motel phone terminal link, or a standard phone terminal link; and the dialed number, for example a standard area code or office code, or a Service Access Code (SAC) such as "800" for INWATS service. Typically, a fourth characteristic on the basis of which a call may be routed exists for access tandems: the incoming trunk group.

Figure 7:
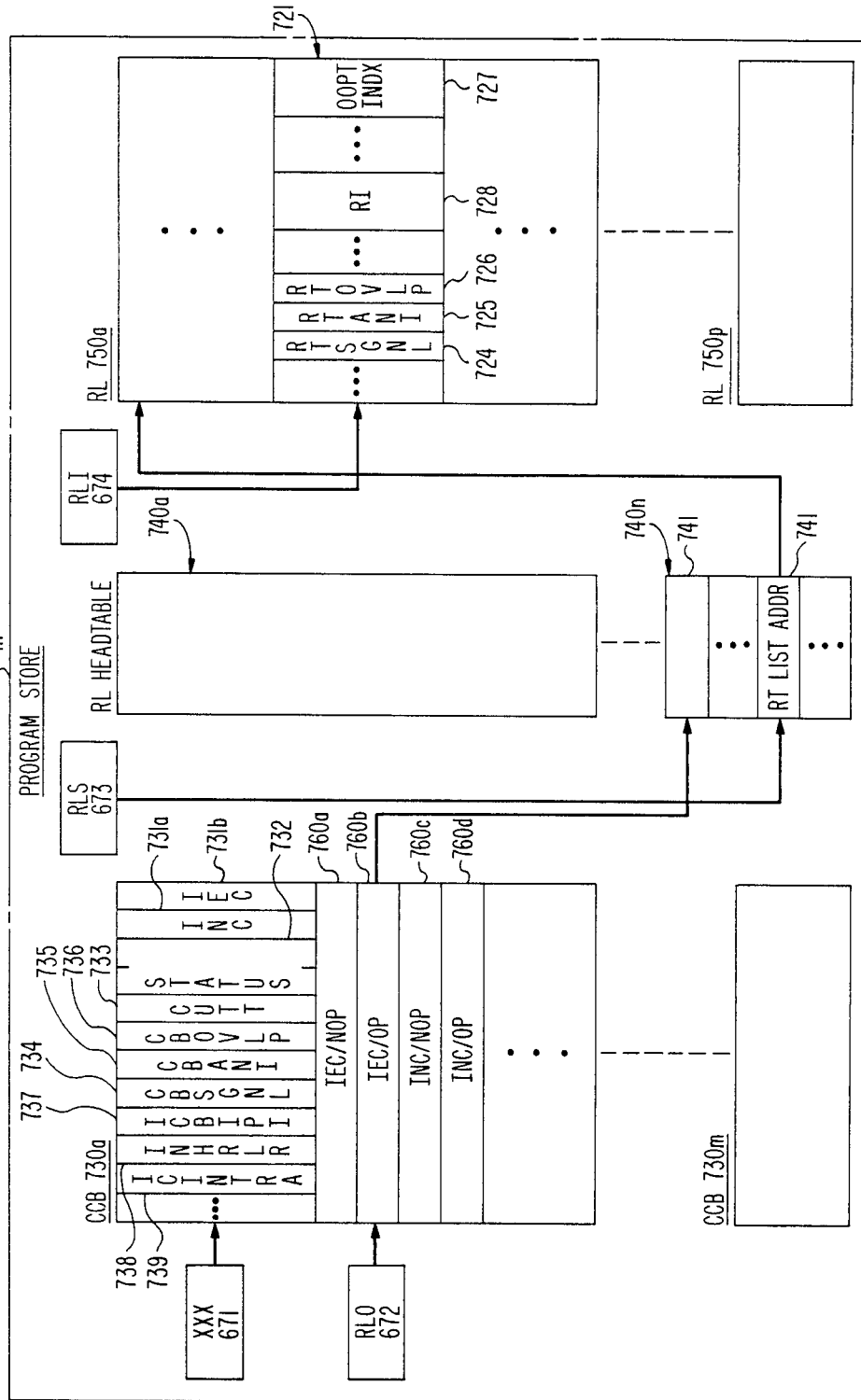
Figure 8A:
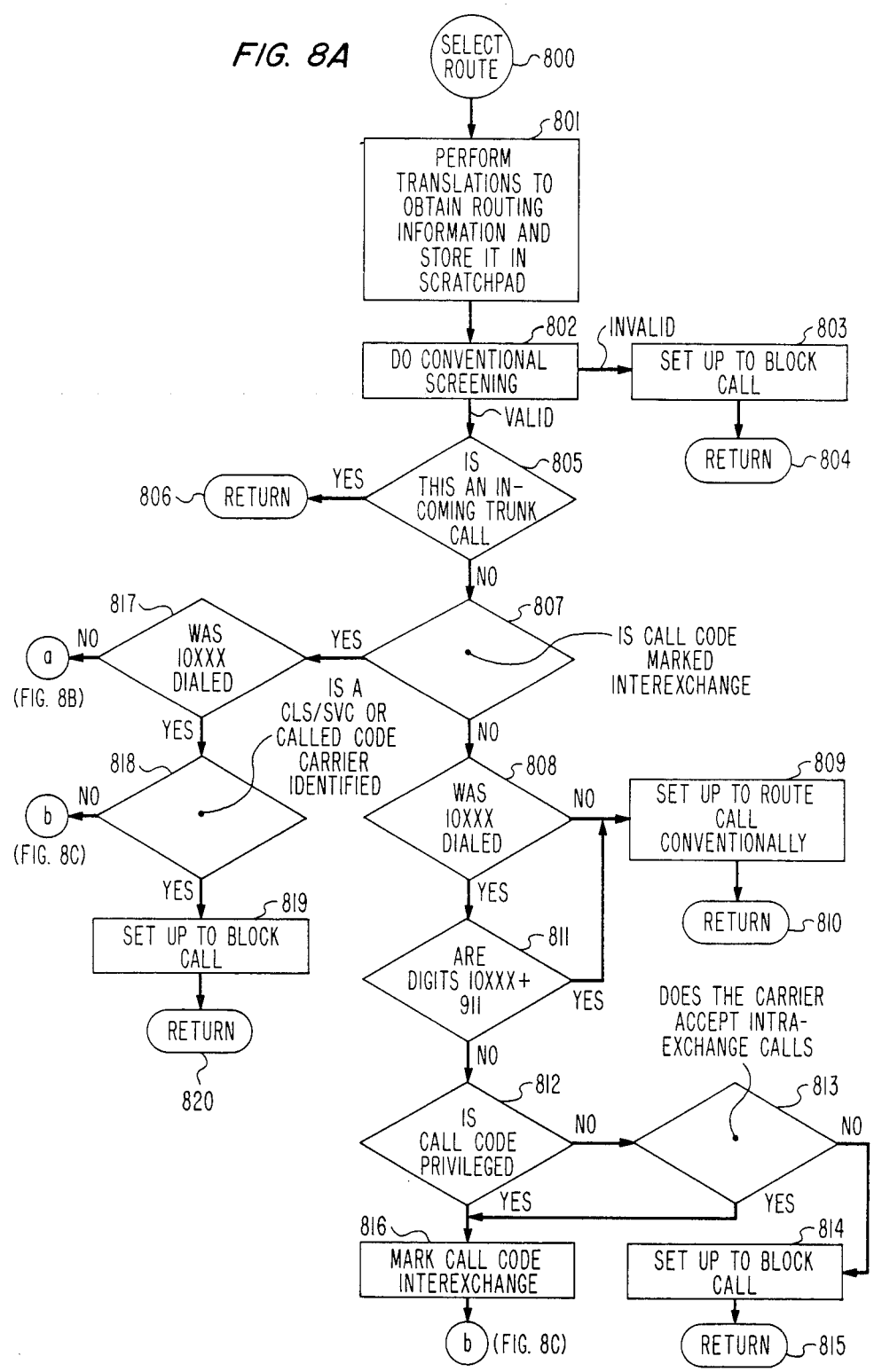
FIGS. 8A through 8E present a logical-flow diagram of the route-selection blocks of FIGS. 3 and 12.
Figure 8B:
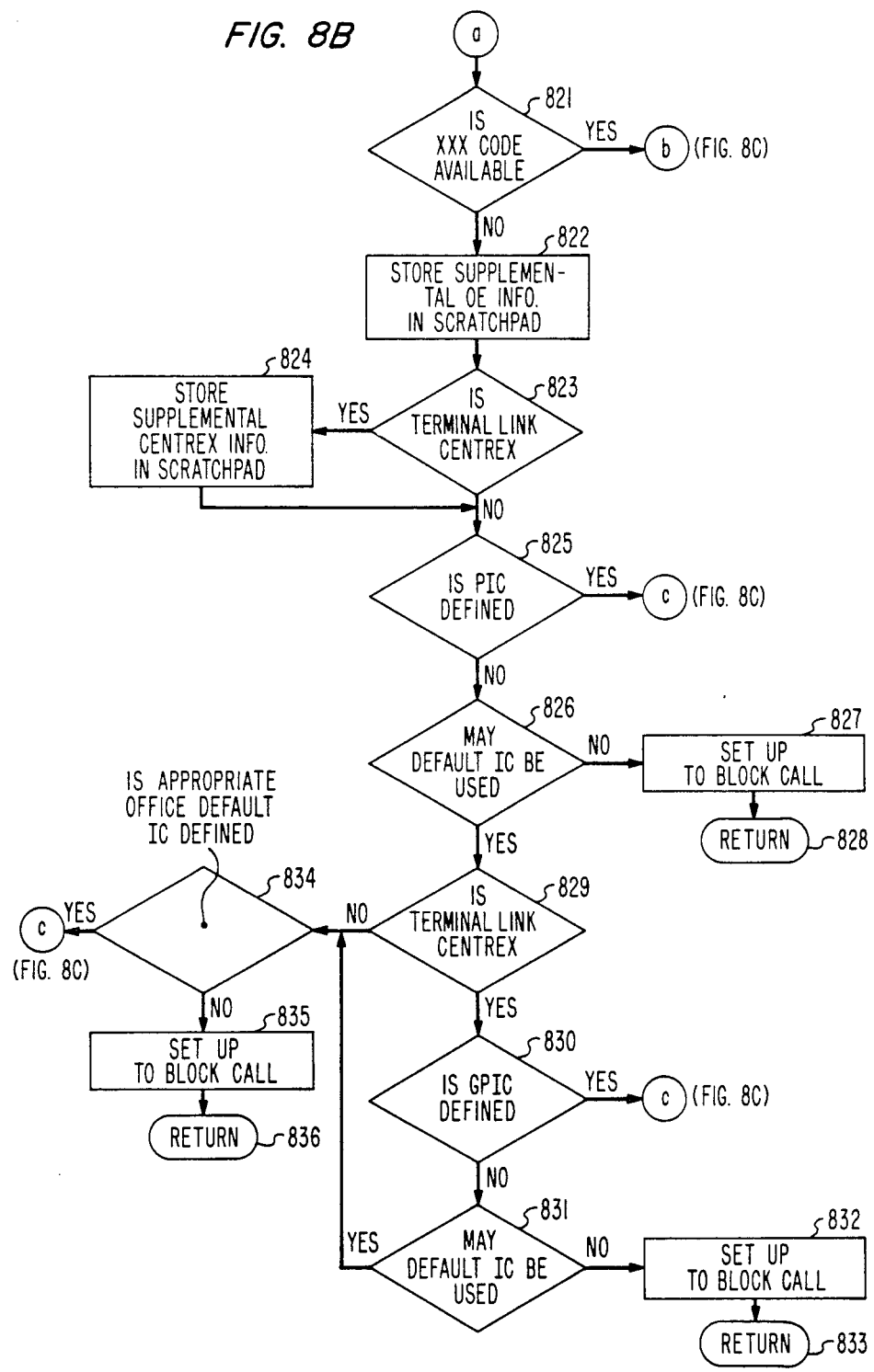
Figure 8C:
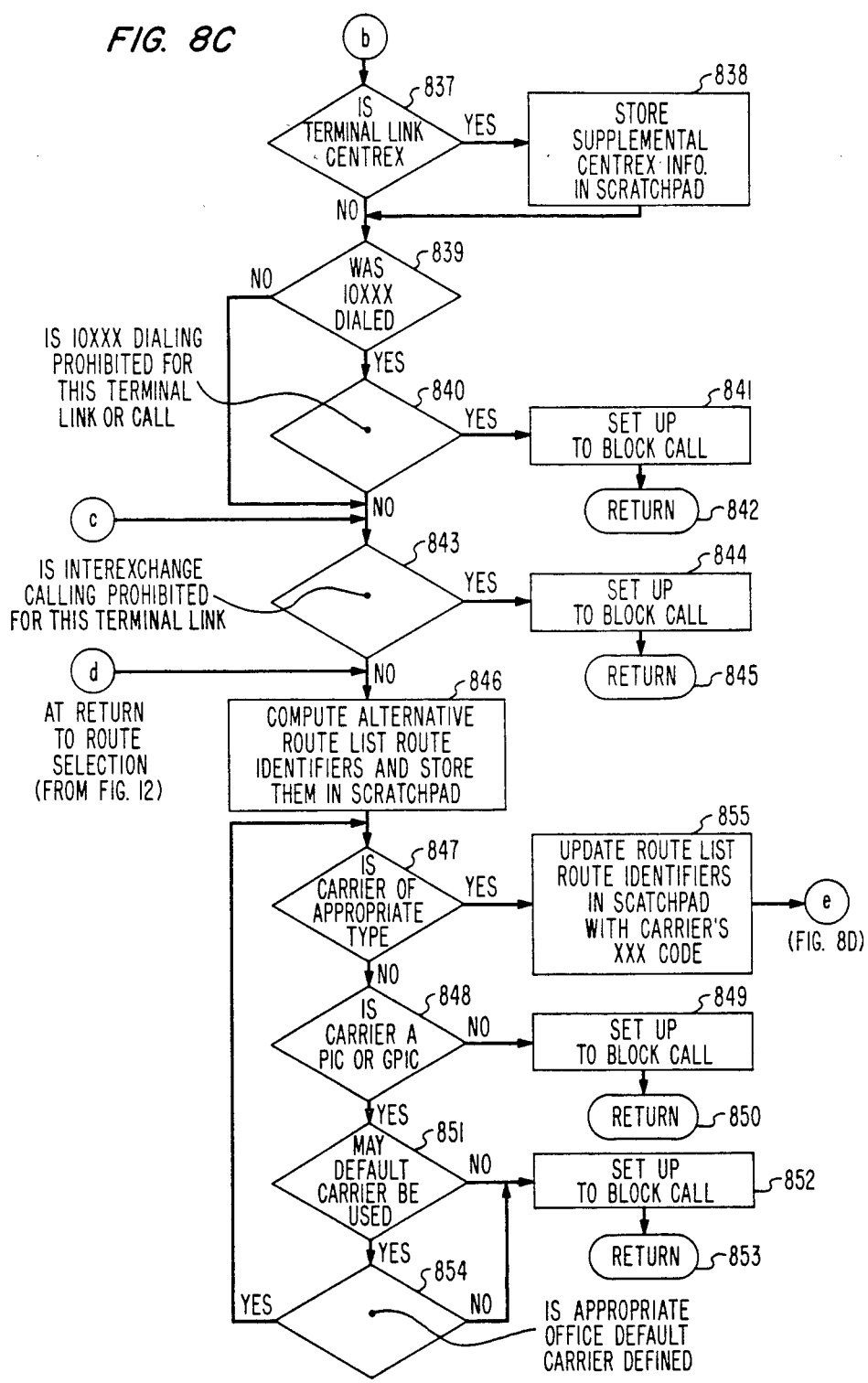
Figure 8D:
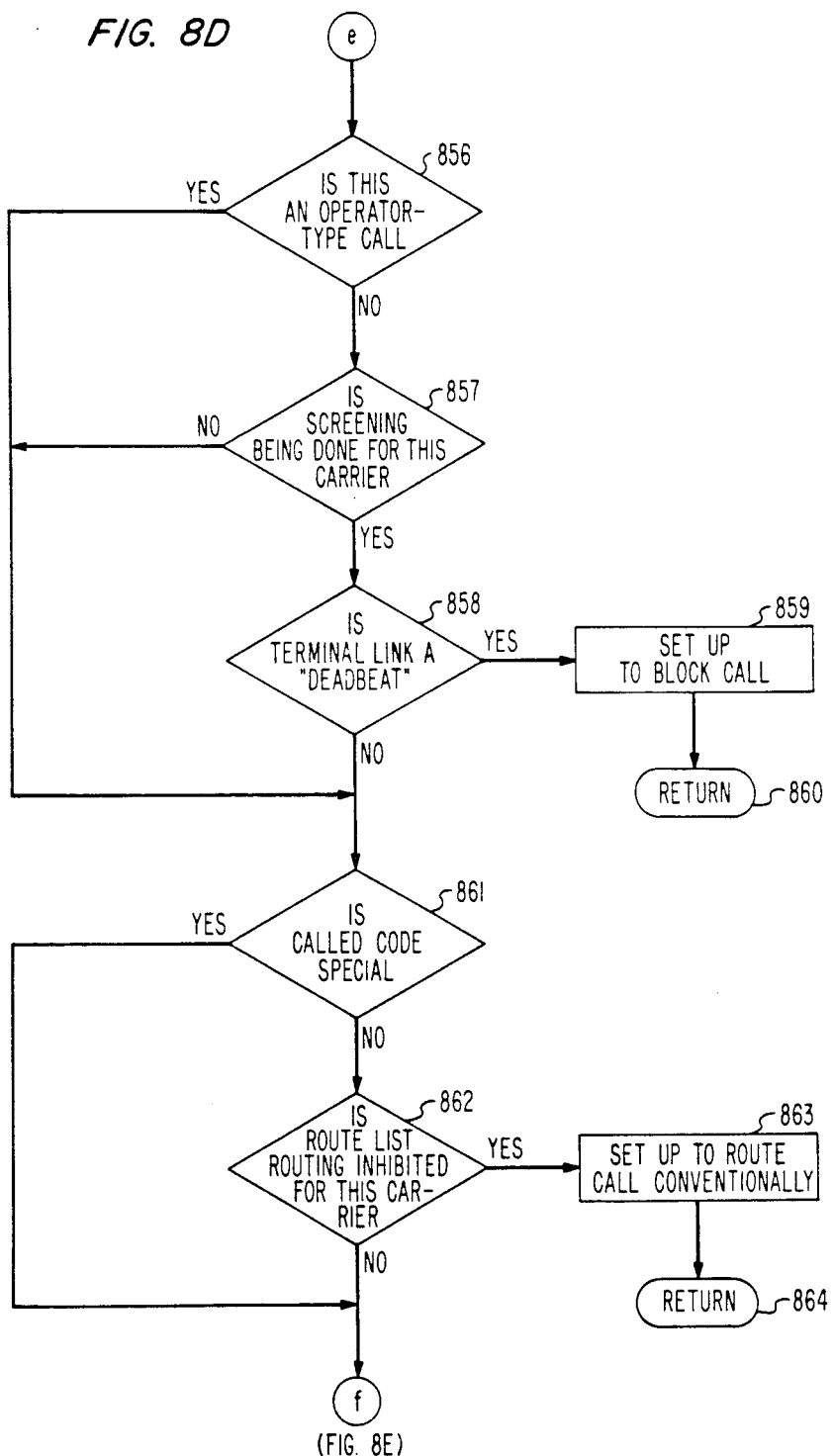
Figure 8E:
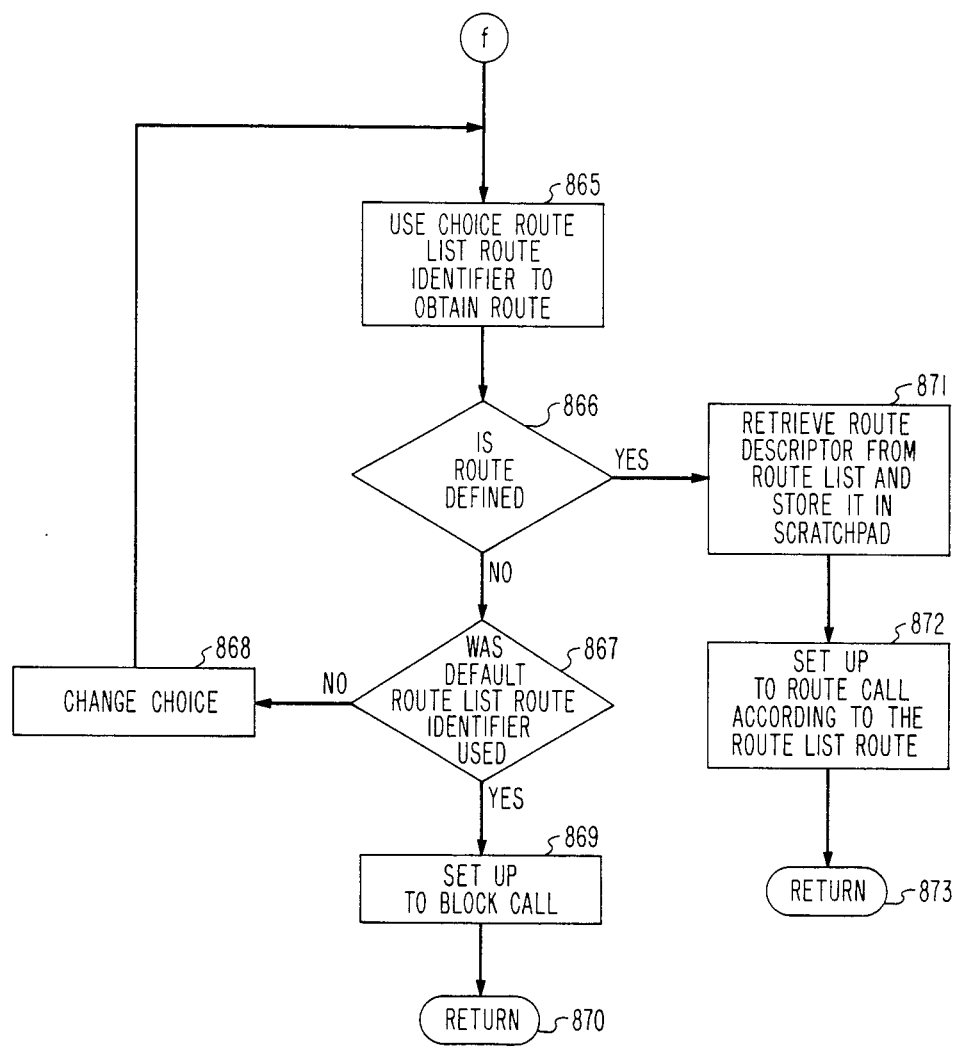

Route selection on the basis of the above characteristics is made via the data structures diagramed in FIG. 7. Each office 95–100 includes data base relations, referred to as carrier common blocks (CCBs) 730, each of which contains information characterizing a respective carrier office 101 and 102. A carrier is identified by the carrier identification code XXX, which serves as a key 671 to the data base for specifying therein the carrier's common block 730. Translation of the XXX code produces a pointer into the data base to that carrier's common block 730.

The carrier characterizations that typically are included in the common block 730 are: INC and IEC indicators 731a–b, respectively, that indicate whether the carrier is a domestic interexchange carrier only, an international carrier only, or both; a STATUS indicator 732 that indicates whether the carrier is an interim-status carrier, i.e., it does not permit itself to be accessed via 10XXX dialing, a long term status carrier, i.e., it does not permit itself to be accessed via 950-1XXX dialing, except from coin and hotel/motel terminal links or not at all, or a transition-status carrier, i.e., it permits both of the above-described types of access; indicators of whether the carrier has selected certain options available to it, such as cut-through, i.e., 10XXX+#, calling indicator (CUTT 733), new signaling protocol indicator (CBSGNL 734), automatic number identification indicator (CBANI 735), overlap-outpulsing indicator (CBOVLP 736); indicators of whether non-payer ("deadbeat") screening (ICBIPI 737) and conventional routing (INHRLR 738) are being done by the end office for the carrier; and an indicator (ICINTRA 739) that indicates whether the carrier is allowed to carry calls to codes not designated as interexchange. Usage of the above-mentioned carrier-character indicators is explained further below.

The carrier common block 730 also includes a plurality of tuples, or entries 760, that point to various relations, referred to as Route List Head Tables (RLH) 740. Generally, each carrier, and hence each carrier common block 730 has its own, dedicated, Route List Head Tables 740. As the name implies, the Route List Head Tables 740 take the form of tables. A key, referred to as a Route List Option (RLO) 672, which is in effect an offset pointer into any carrier common block 730, selects in the carrier common block 730 one of the Route List Head Table tuples 760.

Each Route List Head Table 740 includes a plurality of entries or tuples 741 that point to, i.e., contain addresses of, various tables, which were referred to previously as Route Lists 750. Generally, each carrier has its own, dedicated Route Lists 750. The Route Lists 750 also take the form of tables. A key, referred to as a Route List Selector (RLS) 673, which is in effect an offset pointer into any Route List Head Table 740, selects in the Route List Head Table 740 one of the tuples 741 that point to the Route Lists 750.

Each Route List 750 includes a plurality of tuples, or entries, each of which contains a route descriptor 721. The route descriptor 721 comprises a Route Index 728, in direct analogy to the route descriptor 621 of the Rate and Route Pattern 611 (see FIG. 6). The route descriptor 721 also includes indicators that define signaling options applicable to the route defined by the Route Index 728. These indicators are an RTSGNL indicator 724, an RTANI indicator 725, and an RTOVLP indicator 726. These indicators refer to the signaling options referred to by the indicators 734–736, respectively, of the carrier common block 730. Furthermore, the route descriptor 721 also includes an OOPT INDX 727. This index 727 points to a data base relation containing information that characterizes the switching office, referred to as the Office Options Table 414 (see FIG. 4), and selects therein one of a plurality of ZZZ codes 440. As will be described below, the ZZZ codes 440 are used in routing the call through intermediate switching offices, such as the access tandems 95 and 98, on their way to the final switching office destinations. A key, referred to as Route List Index (RLI) 674, which is in effect an offset pointer into a Route List 750, selects therein one of the route descriptors 721.

The keys 671-674 are obtained in the following manner. Returning to a consideration of FIG. 6, it was mentioned above that translation of dialed digits, including analysis of the prefix, retrieves information from an associated Rate and Route Pattern 611, including an optional CIRPOPT 625, while translation of the class of service of the calling terminal link 127 retrieves information from an associated CLS/SVC relation 612, including a CICLS/SVC 635. The CIRPOPT 625 and CICLS/SVC 635 contain fields 671a-674a and 671b-674b, respectively, for specifying values for the keys 671-674. In the CIRPOPT 625, the value of the RLI field 674a is a function of the called code, and the XXX field 671a generally specifies the carrier to which the code has been assigned. The RLO field 672a and the RLS field 673a are generally null in the CIRPOPT 625. In the CICLS/SVC 635, generally the value of the RLS field 673b is specified and is a function of the class of service of the terminal link 127, while the RLO field 672b, RLI field 674b, and the XXX field 671b are generally null. A value for the XXX key 671 is generally supplied for a call either by the subscriber dialing the 10XXX code, or by retrieving the XXX code for a predesignated carrier, or optionally by retrieving a default carrier ID, or some other such means. Furthermore, default values for the keys 672-674 are generated, as was indicated in block 311 of FIG. 3, for use in the event that other values for the keys 672-674 are not available. The default value of the RLO key 672 is generally obtained as a function of the prefix that was dialed. The respective values of the keys 671-674 that are obtained from the above-mentioned sources are selectively combined, in a manner described below in conjunction with FIG. 8, to obtain the key values 671-674 that are used in accessing the Route Lists 750. Thus, in a typical application, the RLO 672 may be thought of as obtained by analysis of the dialed prefix, or lack thereof, the RLI 674 as obtained by analysis of the dialed digits, and the RLS 673 as obtained by analysis of the class of service.

As can be seen from the above discussion, each of the keys in the sequence of keys 671-674 serves to select one or more route descriptors 721 of a group of possible route descriptors 721 selected by the preceding key in the sequence. And since the keys 671-674 act together to identify in the Route Lists 750 one of the route descriptors 721, analysis of the carrier code, the dialed prefix, the class of service, and the called number specify a particular Route List 750 route for the call.

The above route selection description accompanying FIG. 7 holds true for route selection performed by end offices, and by access tandems for calls incoming on terminal links 127. Route List 750 route selection performed by access tandems for calls incoming on trunks 132 utilizes the data base structure of FIG. 7 and RLS 673, and RLI 674 are obtained in a slightly different manner. For calls incoming on trunks 132, an access tandem does not have directly available to it the dialed prefix, the digits of the called number, and the class of service of the originating terminal link 127. Rather, the access tandem knows the number of the trunk group of the trunk 132 on which the call is incoming and it receives from the end office over that trunk 132 the XXX carrier ID code, plus one of the ZZZ codes 440 that is selected by the OOPT INDX 727 of that route.

In a manner analogous to the translation of the called number and the class of service, the access tandem performs a translation on the received ZZZ code 440 to access in the data base a Rate and Route Pattern 611 that is associated with the ZZZ code; and it performs a translation on the number of the trunk group to access in the data base a relation associated therewith and containing information characterizing the trunk group, referred to as a Trunk Group Relation 413 (see FIG. 4).

From the Rate and Route Pattern 611 the access tandem obtains the CIRPOPT 625. And from the Trunk Group Relation 413 the access tandem may obtain an optional Supplementary Trunk Group relation (SuppTG) 424. The SuppTG 424 is in structure and function analogous to the CIRPOPT 625 and contains an RLO field 672c, an RLS field 673c, an RLI field 674c, and a XXX field 671c. It is expected that in a typical situation, wherein a carrier has only one switching office connected to the access tandem, neither the CIRPOPT 625 nor the SuppTG 424 will define values for any of the keys 671-674, and hence the default values of the keys 671-674 will identify the route that the call will take. However, in situations such as when a carrier has a plurality of switching offices subtending the access tandem and can choose to have calls directed to different ones of the switching offices on the basis of call characteristics, the CIRPOPT 625 and the SuppTG 424 may define values for the keys 671-674. In such situations, the CIRPOPT 625 generally defines a value for RLI 674a, and the SuppTG 424 generally defines the RLS 673c. The values of the keys 671-674 so obtained are again selectively combined with each other, with the default values of the keys 671-674, and with the XXX carrier code received from the end office to form a route identifier that identifies a Route List 750 route for the call.

Referring again to FIG. 7, the first Route List 750, referred to as the Primary Route List 750a, is special. The Primary Route List 750a defines default routes, which are routes utilized for routing a call to a carrier when no alternative route is defined by the other information generally utilized to select a route. The Primary Route List 750a generally defines the following types of default routes: those for calls dialed on a cut-through basis, those for calls dialed on a 950-1XXX basis, those for calls dialed on a 10XXX basis, and those for calls routed indirectly via an access tandem. Based on analysis of the received digits, be it the dialed digits received at an end office or the ZZZ code received at an access tandem, the call is identified as being a member of one of these three call types, and RLO 672d, RLS 673d, and RLI 674d are generated to identify the appropriate default route for the call (see FIGS. 9A-B). This function is represented by block 311 in FIG. 3 and by blocks 1210 and 1214 in FIG. 12.

The default values RLO 672d, RLS 673d, and RLI 674d are the same for all carriers for a particular type of call. Only the carrier identification code, XXX, changes from carrier to carrier and is depended upon to lead to selection of a different Primary Route List 750 entry, and hence a different default Route List route, for each carrier.

Also, all carriers need not have the same number of route list headtables 740, the same number of entries 741 in each headtable 740, the same number of route lists 750, or the same number of entries 721 in each route list 750. Rather, these numbers generally are a function of the number and kind of call characteristics on the basis of which a carrier chooses to have a call routed to it on any but a default route. Therefore calls of different characteristics may result in the default route being selected for different carriers. Likewise, the default route may be utilized with different frequency for different carriers.

Having defined the mechanism through which call route selection takes place, consideration will now be given to the process of call route selection at an end office.

Returning to a consideration of FIG. 3, when sufficient digits are collected, at the block 310, to perform translation thereon, appropriate default route keys 672d-674d are generated and stored in scratch pad 512, at the block 311, and contents of the CIIW 521 are copied into the scratch pad 512, at the block 312, and process of route selection is undertaken, at the block 313. This process is diagramed in logical flow form in FIG. 8.

Turning to block 801 of FIG. 8, the translations described above in conjunction with FIG. 6 are performed to obtain information from data base memory for routing the call. The conventional translations generate the route descriptor 621, retrieve the CIRPOPT 625 and the CICLS/SVC 635, and determine the conventional, class of service-related, screening that is required for this call. The results of the translations are stored in the scratch pad memory 512. The required screening is then performed, in a conventional manner, as indicated in block 802. If the call is for some reason found invalid and fails the screening process, steps are taken in a conventional manner to block the call, as indicated in block 803. The steps taken are, for example, generating a Route Index that will result in the call being connected to an appropriate announcement from the announcement system 121. Call processing is then returned to, as indicated in block 804.

If the call is valid and passes screening, a check is made of whether the call is coming in on a terminal link 127 or an interoffice trunk 132, as indicated in block 805. If the call is coming in on a trunk 132, the switching office is acting in an access tandem capacity, and call processing is returned to, as indicated in block 806. This case will be considered further below in conjunction with FIG. 12.

If the call is coming in on a terminal link 127, the switching office is an end office, or an access tandem acting in an end office capacity. A check must be made to determine whether the call is of a type requiring carrier selection, i.e., whether the call is designated as an interexchange call, as shown in block 807. This can be done by checking the CIRID 622 of the Rate and Route Pattern 611 (see FIG. 6) that is associated with the dialed code, as discussed above.

If the call is not designated as being interexchange, a check is made of the dialed digits to determine if 10XXX was dialed, as suggested in block 808. If not, the call is routed in a conventional manner, as suggested in blocks 809 and 810, according to the route descriptor 621 of the Rate and Route Pattern 611 that was derived via the conventional translation in the block 801. If 10XXX was dialed, a check is made of the dialed digits to determine if this is an improperly dialed emergency call, that is, whether 10XXX+911 was dialed, as indicated in block 811. If so, the call is again routed in a conventional manner, as if 10XXX had not been dialed.

If the dialed digits do not indicate an emergency call, a further check is made to determine whether the called code is designated as privileged, as shown in block 812. This can be done by checking the PRIVC 624 of the Rate and Route Pattern 611 (see FIG. 6) that is associated with the dialed code, also as discussed above.

If the code is not found to be marked as privileged at the block 812, a check is made to determine whether the designated carrier is allowed to accept intraexchange calls, as shown in block 813. This is accomplished by checking an ICINTRA indicator 739 in the carrier common block 730 that is associated with the designated carrier. If the carrier is not allowed to carry intraexchange calls, steps are taken to block the call, as indicated in blocks 814-815, for example by returning a message to the caller that the call cannot be completed because 10XXX was improperly dialed.

If the carrier is allowed to accept intraexchange calls, or if the called code is found to be marked as privileged in the block 812, the call is designated as an interexchange call, and hence as one requiring carrier selection, as suggested in block 816. This is accomplished by setting the scratch pad 512 copy of the CIRID 622 of the Rate and Route Pattern 611 (see FIG. 6) that is associated with the dialed code to the interexchange-indicating state. The call is henceforth treated as an interexchange call and processing continues as described below for blocks 837 et seq.

Returning to the consideration of whether the call is marked interexchange or intraexchange by the CIRID 622 in the block 807, if the call is marked as an interexchange call, a check is made of the dialed digits to determine whether 10XXX was dialed, as shown in block 817. If 10XXX was dialed, a check is made of the XXX field 671a of the CIRPOPT 625 of the Rate and Route Pattern 611 associated with the called code and of the XXX field 671b of the CICLS/SVC 635 of the CLS/SVC relation 612 associated with the terminal link 127 to determine if either identifies a carrier, as indicated in block 818. If either field 671a or 671b does identify a carrier, 10XXX should not have been dialed, and steps are taken to block the call, as indicated in blocks 819-820. If neither field 671a and 671b identifies a carrier, processing continues as described below for blocks 837 et seq.

Returning to consideration of the blocks 817, if 10XXX was not dialed, a check is made of whether a carrier ID code is available, as shown in block 821. This is accomplished in the same manner as the check at the block 818. If an XXX code is not available, the data base is accessed and the supplemental information for the originating terminal link 127 is retrieved and transferred from the Supplementary OE relation 411 of the calling terminal link 127 (see FIG. 4) into scratch pad 512 copy of the fields 531 and 532 of the CIIW 521 of the Originating Register 510 of FIG. 5, as indicated in block 822, similarly to what was done during digit collection for calls dialing the 10XXX code (see block 307 of FIG. 3). As indicated in blocks 823, a check is made to determine if the calling terminal link 127 is a Centrex terminal link. This information is made available as a result of the initial, originating equipment, translation that was described in conjunction with the block 301 of FIG. 3. If the calling terminal link 127 is a Centrex terminal link, the supplemental information for the Centrex group of which the terminal link 127 is a member is retrieved and transferred from the Supplementary Centrex relation 423 (see FIG. 4) into the scratch pad 512, as suggested in block 824. Following the supplementary-information transfers, the PIC 435 in the supplemental OE information, now residing in the scratch pad 512 copy of the CIIW field 531, is checked to determine if a primary interexchange carrier has been predesignated for the terminal link 127, as indicated in block 825. If a predesignated interexchange carrier is defined, call processing returns to the mainstream of interexchange call analysis to check at block 843 whether interexchange calling is allowed for the originating terminal link 127.

If a predesignated interexchange carrier is not defined, a check is made to determine whether a default interexchange carrier may be derived for a call originating with the calling terminal link 127, as suggested in block 826. The check is performed by examining the DUD 430 of the scratch pad 512 copy of the CIIW 521 of the originating register 511. If a default carrier may not be used, steps are taken to block the call, as indicated in blocks 827-828, for example by arranging to connect the calling terminal link 127 to an announcement requesting that a 10XXX code be dialed with the call.

If a default carrier may be derived for the call, a check is again made to determine whether the terminal link 127 is a Centrex terminal link, as indicated in block 829. If the calling terminal link 127 is a Centrex terminal link, the scratch pad 512 copy of the Supplementary Centrex relation 423 associated with that terminal link 127 and others of the Centrex group is accessed and the GPIC field 435 thereof is examined to determine if a default carrier is defined for the Centrex terminal link group of which the calling terminal link 127 is a member, as indicated in block 830. If a group default carrier is identified, call processing returns to the mainstream of interexchange call analysis to check at block 843 whether interexchange calling is allowed for the originating terminal link 127.

If a Centrex group default carrier is not defined, the scratch pad 512 copy of the terminal link's Supplementary Centrex relation 423 is accessed and the GDUD field 430 thereof is examined to determine if an office default carrier may be used for calls originating with the Centrex terminal link group of which the calling terminal link 127 is a member, as suggested in block 831. If a default carrier may not be used, steps are again taken to block the call, as indicated in blocks 832-833, in a manner analogous to that described for the blocks 827-828.

If a default carrier may be used for the Centrex terminal link group, as determined at the block 831, or if the terminal link 127 is not found to be a Centrex terminal link at the block 829, a check is made to determine whether an appropriate default carrier is defined for this telephone office, as indicated in block 834. If a call is a world zone 1 interexchange call, an appropriate carrier for this type of call is an interexchange carrier; if a call is an international call, an appropriate carrier for this type of call is an international carrier. Of course, a combined interexchange and international carrier is appropriate for both types of calls. The check for an appropriate default carrier is accomplished by accessing in the data base the office options table 414 (see FIG. 4) which contains information characterizing this office, and retrieving from either the entry 441a which may identify an IEC, or the entry 441b which may identify an INC, the appropriate office default carrier identification. If an appropriate office default carrier is not defined, appropriate steps are again taken to block the call, as indicated in blocks 835-836, such as arranging to return a message to the caller that the call must be tried again and requesting that 10XXX be dialed. If an appropriate office default carrier is defined, processing returns to the mainstream of interexchange call analysis at the block 843 to check whether interexchange calling is allowed for the originating terminal link 127.

Alternatively, no provision for designating an office default carrier may be made, in which case appropriate steps to block the call are taken upon finding that a terminal link or Centrex group PIC is not defined, at the blocks 825 and 830.

Returning to the consideration of whether an XXX code is available for a call marked interexchange, at the block 821, if the XXX carrier ID code is available, a check is made to determine if the calling terminal link is a Centrex terminal link, as indicated in block 837. If the calling terminal link 127 is a Centrex terminal link, the supplemental information for the Centrex group of which the terminal link 127 is a member is retrieved and the transferred from the Supplementary Centrex relation 423 into the scratch pad 512, as shown in block 838. Following this transfer, or if the terminal link 127 is not a Centrex terminal link, a check is made to determine if 10XXX was dialed, as indicated in block 839. If not, call analysis proceeds to the block 843. But if 10XXX was dialed, a check is made to determine whether 10XXX dialing is prohibited for the calling terminal link 127 or for this call, as indicated in block 840. For a non-Centrex terminal link 127, a check is made by examining the PROXX 432 of the scratch pad 512 copy of the CIIW 521 to determine whether the terminal link 127 is prohibited from dialing 10XXX. For a Centrex terminal link 127, information contained by the scratch pad 512 copy of the GPROXX 432 of the Supplemental Centrex relation 423 is combined with the information contained by the scratch pad 512 copy of the PROXX 432 of the Supplemental OE relation 421 of that terminal 127 to obtain a union, i.e., an inclusive set, of 10XXX dialing restrictions applicable to the terminal link 127, and the result is checked to determine whether the terminal link 127 is prohibited from dialing 10XXX. A check is also made of the XXX fields 671a and 671b of the CIRPOPT 625 and CICLS/SVC 635 (see FIG. 6), respectively, to determine if either one identifies a carrier. If either condition exists, 10XXX dialing is prohibited and steps are taken to block the call, as indicated blocks 841-842, for example, arranging to return an announcement informing the caller that 10XXX dialing is not allowed. If 10XXX dialing is not prohibited, call analysis proceeds to the block 843.

At the block 843, a check is made to determine whether interexchange calling of any type is prohibited for the calling terminal link 127. For a non-Centrex terminal link 127, this check is done by examining the INTRES 431 of the scratch pad 512 copy of the CIIW 521. For a Centrex terminal link 127, the INTRES 431 of the scratch pad 512 copy of the CIIW 521 and the GINTRES 431 of the scratch pad 512 copy of the Supplemental Centrex relation 423 are combined to obtain a union of interexchange calling restrictions applicable to the terminal link 127, and the result is examined to determine the interexchange calling restriction. If interexchange calling is prohibited, steps are taken to block the call, as indicated in blocks 844-845, for example, arranging to return an announcement to the caller indicating that interexchange calling is not allowed.

If interexchange calling is not prohibited, computations are performed to obtain identifiers of possible Route List routes that can serve as alternatives to the default route identified by the initially-generated default Route List route identifier, and the results are stored in the scratch pad 512, as indicated in block 846. For an explanation of the computations, reference is made to FIG. 9A, which shows a logical layout of a portion of the scratch pad 512 that is associated with the data base.

As was explained in conjunction with the block 311 of FIG. 3, in the case of an end office or an access tandem acting in an end office capacity, default values for the keys 672d–674d are generated and stored in the scratch pad. As indicated in FIG. 9A, the default values RLO 672d, RLS 673d, and RLI 674d are stored in a first word 901 of the scratch pad. The contents of the first word 901 also include the XXX code 671 of whatever carrier was selected to carry the call, and they define the default Route List route identifier.

As was further explained in conjunction with the block 801, in the case of an end office or an access tandem acting as end office, translations are performed on the dialed digits and the class of service to obtain, inter alia, a CIRPOPT 625 and CICLS/SVC 635, whose contents are then stored in the scratch pad 512. The values, if any, of the keys 671–674 that are retrieved from the CIRPOPT 625 and the CICLS/SVC 635 are now used to modify the default Route List route identifier and thus to form alternative Route List route identifiers.

In the end office type of case, any of the key values 671a–674a that are defined in the CIRPOPT 625 take precedence over any of the key values 671b–674b that are defined in the CICLS/SVC 635 and the default values 672d–674d. Any of the key values 671b–674b in turn take precedence over any of the default values 671d–674d. Therefore any defined key values 671a–674a are substituted for the default values 672d–674d, any defined key values 671b–674b are substituted for any remaining default values 672d–674d, and the result is stored in a third word 903 of the scratch pad 512 to form therein a first, preferred, alternative Route List route identifier. As was explained previously, in conjunction with FIG. 6, in the most common case of telephone call, the CIRPOPT 625 of the Rate and Route Pattern 611 is absent and the CICLS/SVC 635 of the CLS/SVC relation 612 generally defines a value for the RLS 673b. Hence, as shown in FIG. 9A, the first alternative Route List route identifier of the third word 903 most commonly comprises the RLO 672d, RLS 673b, and RLI 674d.

A second alternative Route List route identifier is formed by setting the value of the RLI 674 of the first Route List route identifier of the third word 903 of the scratch pad 512 to zero, thus causing a default route of the selected Route List 750 to be identified. As shown in FIG. 9A, the second alternative Route List route identifier is stored in a second word 902 of the scratch pad 512. Thus a sequence of route identifiers comes to be stored in the scratch pad 512.

Returning to consideration of FIG. 8, when the alternative Route List route identifiers have been computed at the block 846, a check is made of the INC field 731a and the IEC field 731b of the carrier common block 730 of whatever carrier was in the preceding processes selected to carry the call to determine if the carrier is of an appropriate type for the call, as indicated in the block 847.

If the carrier is not indicated to be of the proper type, a check is made of whether the carrier is the predesignated carrier identified by the PIC field 435 of the terminal link's OE relation 411, or also by the GPIC field 435 of the Centrex relation 412 in the case of a Centrex terminal link 127, as suggested in block 848. If the carrier is not a predesignated carrier, appropriate steps are taken to block the call, as indicated in blocks 849–850. If the carrier is a predesignated carrier, a check is again made to determine if a default carrier may be used for the call, as suggested in block 851. For a non-Centrex terminal link 127, this is accomplished by checking the DUD 430 of the supplementary information field 531 of the scratch pad 512 copy of the CIIW 521. For a Centrex terminal link 127, the DUD 430 of the scratch pad 512 copy of the CIIW 521 and the GDUD 430 of the scratch pad 512 copy of the Supplemental Centrex relation 423 are combined to obtain a union of restrictions on the use of a default carrier that are applicable to the terminal link 127, and the result is examined to determine whether a default carrier may be used. If a default carrier may not be used, appropriate steps are taken to block the call, as indicated in blocks 852–853. If a default carrier may be used, a check is made of the previously-mentioned office options table 414 to determine if an appropriate office default carrier is defined, as indicated in block 854. Propriety of the carrier is here determined on the same basis as was discussed in conjunction with the block 834, i.e., whether both the call and the carrier are designated as being either "domestic" or "international". If an appropriate office default carrier is not defined, steps are again taken to block the call, as indicated in the blocks 852–853. If an appropriate office default carrier is defined, processing returns to the block 847 to check whether the carrier is indeed of the appropriate type, or whether an error has occurred.

Alternatively, no provision for designating and selecting an office default carrier may be made, in which case steps are taken to block the call if a carrier is not found to be of the appropriate type in the block 847.

If an appropriate carrier exists, as determined in the block 847, its XXX ID code is stored in the XXX field 671 of the Route List route-identifying words 901–903 of the scratch pad (see FIG. 9), substituting therein for any previously stored XXX values, as suggested in block 855.

Following updating of the Route List route-identifying words with the carrier ID code, the collected (dialed) digits are checked at block 856 to determine if the call is to an operator or requires operator assistance. If the call is not an operator-type call, a check is performed, at block 857, to determine if non-payer ("deadbeat") screening is being provided by the intraexchange company to the interexchange carrier designated to carry this call, or whether the carrier is doing its own screening. This check is made by examining the ICBIPI 737 of the carrier common block 730 (see FIG. 7). If screening is being done for the carrier, a check is performed, by examining the DEDSI 433 of the scratch pad 512 copy of the CIIW 521 to determine whether the calling terminal link 127 is classified as a "deadbeat", as indicated in the block 858. If the calling terminal link 127 is designated as a "deadbeat", steps are taken to block the call, as indicated in blocks 859–860, for example by arranging to return a message to the caller that his interexchange calls cannot be completed because of nonpayment of interexchange call bills.

If the calling terminal link 127 is not classified as a "deadbeat" at the block 58, if the call is not an operator-type call, as determined at the block 856, or if screening is not being done for the carrier as determined at the block 857, steps are taken to determine whether conventional routing or Route List routing is appropriate for the call.

As indicated in block 861, a check is made to determine whether the called code is special. The received digits are checked to determine if the call is to an operator (i.e., "10XXX+0—" was dialed), if the call is cut-through (i.e., "10XXX+#" was dialed), or if this is a call to an access tandem (i.e., "ZZZ" was dialed). A check is also made of the PRIVC 624 and CIRID 622 of the Rate and Route Pattern 611 (see FIG. 6) associated with that code to determine if the code is privileged or intraexchange, respectively. If the called code does not meet any of these conditions, the INHRLR 738 of the carrier's common block 730 is checked to determine if route list routing is inhibited for this carrier, as indicated in block 862. If route list routing is inhibited, steps are taken to route the call conventionally, according to the route descriptor 621 generated from the Rate and Route Pattern 611 in the conventional translation at the block 801, as suggested in block 863. Call processing is then returned to, as indicated in block 864.

If, however, the called code meets at least one of the conditions at the block 861, or if route list routing is not found to be inhibited at the block 862, steps are taken to obtain a route for the call from the Route Lists 750. As indicated in block 865, the choice Route List route identifier is used first to try and obtain a route for the call. In the end office type of situation, portrayed in FIG. 9A, the first choice, preferred, route identifier that is available is the one contained in the third word 903 of the scratch pad 512. In the manner described previously, the keys 671–674 contained thereby are used to access the data structures of FIG. 7. If any one of the data structure tuples indicated by those keys 671–674 is not defined, i.e., is null, or simply does not exist, the route sought to be obtained is considered undefined. For example, if the one of the tuples 760 that is specified by the RLO 672 in a carrier common block 730 selected by the XXX key 671 is not defined, the sought-after route is undefined. Or if the one of the tuples 741 of the RL head tables 740 that is specified by the RLS 673 is not defined, the route is undefined. Likewise, if the one of the route descriptors 721 of the Route Lists 750 that is specified by the RLI 674 is not defined, the route is undefined.

As indicated in blocks 866–868, if the undefined sought-after route is an alternative route to the default route, the choice of Route List route identifiers is changed to pick the next sequential route identifier of the sequence of route identifiers stored in the scratch pad 512. The second choice route identifier that is sequentially available in the end office type of situation is the one contained in the second word 902 of the scratch pad. This Route List route identifier is now used at the block 865 to access the data structures of FIG. 7 in an attempt to obtain a route for the call. And if this route is found to be undefined at the block 866, the next sequential route identifier, in this case the default Route List route identifier, is next used to access the data structures of FIG. 7 to try and obtain a route, as suggested by the blocks 867, 868, and 865. Considering again the blocks 866 and 867, should even the route indicated by the default Route List route identifier be undefined, steps are taken to block the call, as indicated by blocks 869 and 870. But if one of the Route List route identifiers does lead to a defined route, the descriptor 721 of that route is retrieved from the Route Lists 750 and is stored in the scratch pad, as indicated in block 871.

Generally, at least the default route is defined, and it provides the capability of routing any call for which a special route has not been defined to a carrier across a basic, "generic", route. Under the above-described scheme, a route for a call may be specified or not specified, and the specification may be added, changed, or deleted, independently of the routing specified for any other calls to this, or any other, carrier, and without much regard for the current existence or availability of the route to this or any other carrier.

Following retrieval of a route descriptor 721 at the block 871, conventional steps are taken to enable routing of the call according to the route descriptor 721 obtained from the Route Lists 750, as indicated in block 872. Call processing is then continued, as indicated in block 873. Upon return to call processing, the route for the call is established, if possible, according to the route descriptor 721.

As was indicated in the discussion accompanying FIG. 7, a Route List route descriptor 721 includes an indicator RTSGNL 724 and the carrier Common Block 730 of the selected carrier includes a corresponding indicator CBSGNL 734. These indicators indicate whether a conventional MF signaling scheme or a new MF signaling scheme should be followed in establishing the route for the call. The new signaling scheme is used only when both RTSGNL 724 and CBSGNL 734 indicate that it should be used.

Referring to FIG. 3, in the end office-type of case, upon return from call analysis with the descriptor of the selected route, a check is made to determine whether the new MF interoffice signaling scheme should be used, as indicated in block 314. If the route descriptor returned by call analysis is the conventional route descriptor 621, or if either of RTSGNL 724 and CBSGNL 734 indicate conventional signaling, the route for the call is established in a conventional manner, using conventional signaling, as indicated in block 316, and the call is henceforth processed in the conventional manner, as indicated in block 317.

Figure 10A:
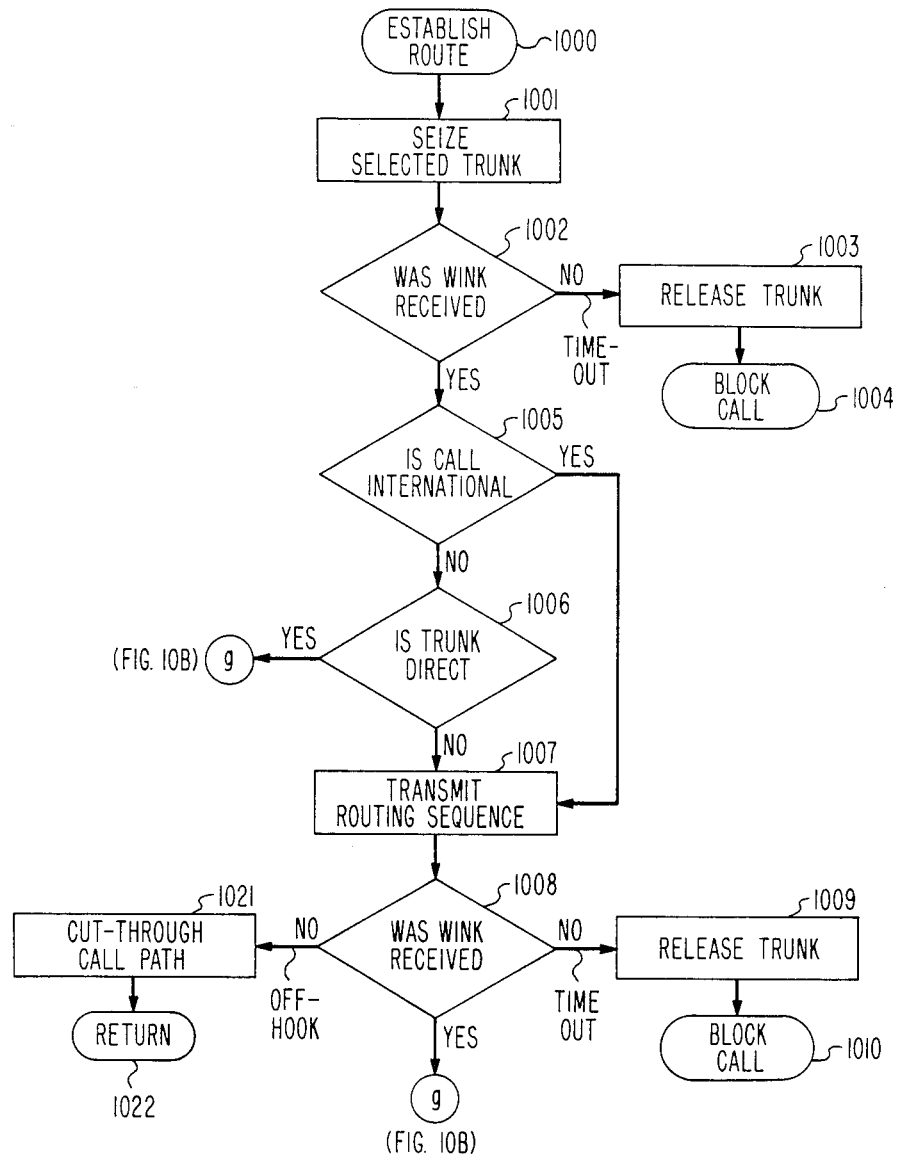
FIGS. 10A and 10B present a logical-flow diagram of the route establishment block of FIG. 3.
Figure 10B:
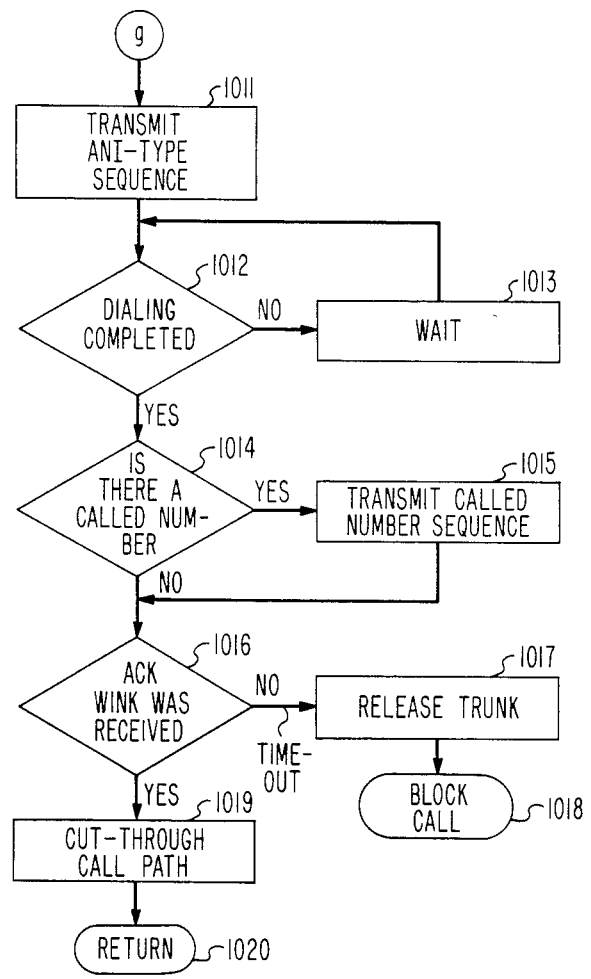

If, however, new signaling is indicated, the call route is established in the manner shown in FIG. 10, as indicated in block 315, before conventional call processing is resumed at the block 317. FIG. 10 is considered next.

The route descriptor 721 returned by call analysis specifies the interexchange call route in a conventional manner, by specifying a group of trunks 132 over which the call should be routed. But in describing how the call route is established, a number of factors must be considered that affect the process. First, the trunks 132 may provide direct connections between the originating end office 100 and the switching office 101 of the interexchange carrier, in the example of FIG. 1, or interexchange calls may be routed between the end office 100 and the interexchange carrier office 101 indirectly, through the access tandem 98, either because the end office 100 has no direct trunks 132 leading to the carrier office 101 or because all direct trunks 132 are busy or out of service. Second, the call being routed may be a domestic call routed to a domestic interexchange carrier, or an international call ultimately routed to an international carrier. And third, not all end offices are necessarily electronic switching systems. Some end offices are still of the old electromechanical type and these offices may not have the capability of selecting carriers on an equal basis and of engaging in the new signaling protocol. The call setup procedures for various combinations of the factors will be described separately. But as was indicated above, it is assumed in all cases that MF signaling is utilized to implement interoffice communications.

The case of the electronic end office 100, or access tandem acting as an end office, having direct trunk 132 connection to the interexchange carrier office 101 and routing a domestic interexchange call is described first. The call path setup procedure for this case is diagrammed in logical flow form in FIGS. 10 and 11.

As was mentioned above, the route descriptor 721 specifies the path which the call should follow in a conventional manner. Referring to FIGS. 2 and 10, selection of a trunk 132 by the end office 100 and connection thereto is accomplished in a conventional manner. As part of the conventional process of selecting the trunk 132, the trunk circuitry 131 is directed by the central control 109 to seize the trunk 132, as indicated in block 1001 of FIG. 10, by applying an off-hook signal to the outgoing end of the trunk 132. A path may also be reserved by the central control 109 through the switching equipment—the terminal link network 104 and the trunk link network 105—between the terminal link 127 and the trunk 132, and a multifrequency (MF) tone transmitter 128 is connected to the outgoing end of the trunk 132, also as part of the conventional process. Additionally, the originating equipment number OE is translated by the end office 100 in a conventional manner to obtain the conventional automatic number identification (ANI) code for the originating terminal link 127. The ANI generally comprises the directory number, including area code, of the calling terminal link 127.

Figure 11:
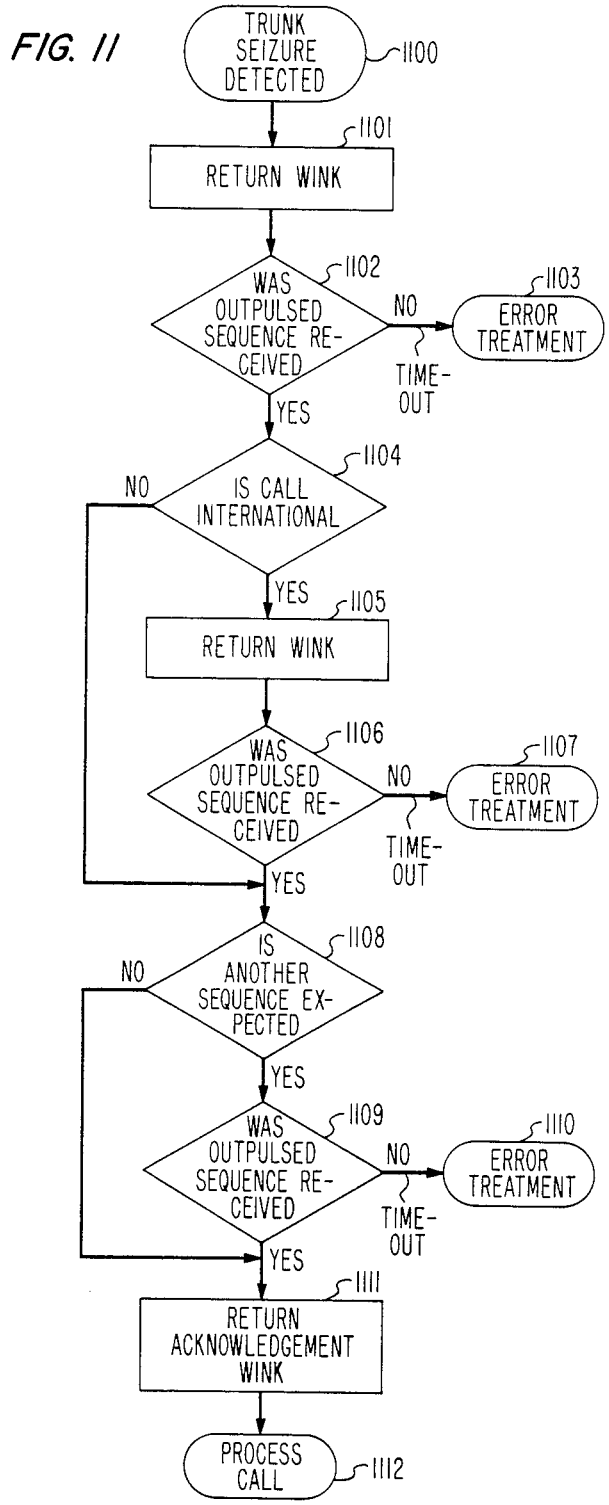
FIG. 11 presents a logical-flow diagram of carrier-office call processing.

As was assumed above, the selected trunk 132 is a direct trunk connecting the end office 100 directly to the interexchange carrier 101. Trunk circuitry 131 at the carrier's incoming end of the trunk 132 monitors the trunk 132 in a conventional manner. Referring to FIG. 11, when the trunk circuitry detects the off-hook signal thereon, signaling seizure of the trunk 132 by the end office 100, as indicated in block 1100, the carrier office 101 responds by getting ready, in a conventional manner, to receive information over that trunk 132. Part of this preparation process includes connection of a MF tone receiver 125 to the incoming end of the trunk 132. When the interexchange carrier office 101 is ready to receive MF signaling, it directs circuitry at the incoming end of the trunk 132 to apply a standard signal, referred to as a standard wink, to the trunk 132, as indicated in block 1101. The wink is a off-hook signal of predetermined duration.

Referring again to FIG. 10, the end office 100 monitors the trunk 132, awaiting the wink, as indicated in block 1002. If the wink is not received by the end office 100 within a predetermined period of time, the end office 100 releases the trunk 132, as indicated in block 1003, by returning it to the on-hook state. As indicated in block 1004, the end office 100 also takes steps necessary to block the call, such as connecting the subscriber to an appropriate announcement from the announcement system 121. Alternatively, the end office 100 may take steps to retry the call, for example on a different trunk 132 of a common trunk group. But if a timely wink is received at the end office 100, it is taken as an indication that the office 101 at the other end has recognized the seizure and that it is ready to receive MF signaling.

As indicated in block 1005, different treatment is provided for international calls and for domestic calls. And as indicated in block 1006, different treatment is likewise provided for calls routed via direct and indirect trunks. If the call that is being routed over a direct trunk 132 has been dialed by the subscriber as a domestic call, i.e., the subscriber dialed a domestic number or zero for a domestic operator, the end office 100 responds to the receipt of the wink at block 1002 in the manner indicated in block 1011: by outpulsing on the trunk 132 multifrequency signals representing the sequence $$KP+II+ANI+ST$$

where KP is a conventional MF signaling key pulse that indicates the beginning of a signaling sequence and allows the receiver of the sequence to become synchronized therewith; where II indicates a pair of information digits whose possible values are assigned the meanings shown in Table 3-F of Technical Reference Publication 61201, entitled "Compatibility Information for Feature Group D Switched Access Service", published by American Telephone and Telegraph Company, June, 1983; where ANI (automatic number identification) is either a sequence of three digits identifying the area code in which the call is originating for calls whose terminal link's originating equipment number (OE) cannot be identified (for example, multiparty line telephone calls), or a sequence of 10 digits comprising the area code and the directory number of the terminal link 127 for calls whose OE can be identified, and where ST is the conventional one of a number of signals that indicate the end of an MF signaling sequence.

If the call was dialed as a cut-through-to-carrier call, i.e., the number (#) sign was dialed from a dual-tone multifrequency subscriber set, and cut-through calls are indicated by CUTT 733 of the carrier common block 730 (see FIG. 7) to be permitted, the end office outpulses the sequence $$KP+II+ANI+ST'$$

where ST' signifies that this is a cut-through call.

If the interexchange carrier office 101 also handles conventional carrier dialing, interexchange calls may be dialed in the conventional manner via dialing 950-1XXX, where 950 is a code indicating that digits that follow identify an interexchange carrier and XXX is the carrier identification. It is the carrier's option to handle calls dialed on a 950 basis. The option is indicated by the STATUS field 732 stored at the end office 100 in the carrier's common block 730 (see FIG. 7). If the call is dialed on a 950-1XXX basis and the carrier has opted to accept these kinds of calls, the end office outpulses the sequence $$KP+II+ANI+ST''$$

in the case of a telephone call originating from special equipment, such as a public telephone, hotel and motel telephone, or end office unequipped for any but the conventional 950-1XXX means of carrier selection. The sequence $$KP+II+ANI+ST'''$$

is outpulsed otherwise on a 950-type call.

Furthermore, if the call is a test call, the end office outpulses either the sequence $$KP+10X+ST$$

or

KP+95X+XXXX+ST where 10 or 95 are the II digit values reserved for test calls and where each X represents a digit generated by the end office for test call purposes. The various situations are summarized in Table Y.

TABLE Y

| Interexchange Signaling Non-International | |
|---|---|
| SITUATION DIALED<br>( ) Indicates Optional<br>Digits | OUTPULSING SEQUENCE<br>( ) Indicates Optional Digits<br>For ANI Option |
| (10XXX)+(1)+7/10 Digits | KP+(II+ANI)+ST+<br>KP+7/10D+ST |
| (10XXX)+0+7/10 Digits | KP+(II+ANI)+ST+<br>KP+0+7/10D+ST |
| 950—1XXX<br>Option | KP+(II+ANI)+ST''' |
| 950—1XXX<br>Special Equipment | KP+(II+ANI)+ST'' |
| 950—1XXX<br>Office Unequipped<br>For New Signaling | KP+ST'' |
| 10XXX+# | KP+(II+ANI)+ST' |
| 10XXX+0 | KP+(II+ANI)+ST+<br>KP+0+ST |
| 10X<br>Test Call | KP+10X+ST |
| 95X—XXXX<br>Test Call | KP+95X+XXXX+ST |

An option is provided to the carrier office 101 to not receive the call-identifying information, i.e., II +ANI. The carrier may choose either to not receive the call-identifying information at all, as indicated by CBANI 735 in the carrier common block 730 (see FIG. 7), the carrier may choose not to receive the call-identifying information only across particular routes, as indicated by RTANI 725 in the route descriptor 721 (see FIG. 7), or the carrier may choose not to receive the call identifying information only for particular dialed codes, such as special service access codes that are assigned to that carrier, as indicated by RPANI 675 of the rate and route pattern 611 (see FIG. 6). If RPANI 675 indicates that the call-identifying information is not to be sent, or if either CBANI 735 or RTANI 725 indicate that the call-identifying information is not to be sent, the end office 100 transmits to the carrier the ANI-type of sequence without II+ANI, also as summarized in the Table Y.

If a call is direct-dialed, outpulsing may be commenced when the last four digits of the called number remain to be dialed by the caller, if permitted. Analogous to the above-described ANI situation, permission to overlap outpulsing with digit collection is indicated by CBOVLP 736 of the carrier common block 730 together with RTOVLP 726 of the route descriptor 721 (see FIG. 7). If overlap outpulsing is not permitted, at the end of outpulsing of the ANI-type sequence the end office 100 may have to wait for dialing to be completed, as indicated by blocks 1012 and 1013. But even if overlap outpulsing is permitted, there may not be a called number, as indicated by block 1014, in which case no wait is involved.

Assuming that a called number does exist, the end office 100 outpulses on the trunk 132 a sequence indicative of that called-number destination of the call, as suggested by block 1015. If the call is a domestic call, the end office outpulses on the trunk the destination sequence

KP+(0)+7/10D+ST, where 7/10D are either the 7 or 10 digits of the called directory number, with or without the area code, and where 0 is outpulsed only if 0 was dialed before the called number to request operator assistance. If the call is a call to a domestic interexchange operator, i.e., 10XXX+0 was dialed, the office outpulses the destination sequence

KP+0+ST.

On any other type of domestic interexchange call, a called number is not available and hence the called-number sequence is omitted. These situations are summarized in the Table Y.

Considering now FIG. 11, following its transmission of the first wink to the end office 100, at block 1101, the carrier office 101 monitors the trunk 132 awaiting receipt of the ANI-type sequence, as indicated in block 1102. The ANI-type sequence may be used by the carrier office 101 for billing purposes. If the sequence is not received by the carrier office 101 within a predetermined period of time, the carrier office 101 treats the trunk seizure that it detected as an error, as indicated in block 1103, and deals with it in a conventional manner.

If the carrier office 101 does receive the outpulsed sequence in a timely manner, it examines the information conveyed thereby. As indicated in block 1104, different treatment is accorded to international and to domestic calls, and the office 101 examines the digits following the KP code to determine whether they are 1N/N'X to signify an international call. 1N/N'X will be defined further below in conjunction with international calls.

Not finding the call to be international, the office 101 further examines the sequence to determine whether it should expect to receive another sequence, as indicated in block 1108. The carrier office 101 makes the initial determination by checking whether the received ST code is primed or unprimed. A primed ST code, i.e., ST', ST'', or ST''', indicates to the carrier office 101 that a second sequence should not be expected. An unprimed ST code directs the carrier office 101 to examine the first two digits following the KP code. If these digits are 10 or 95, a test call is indicated (see Table Y) and the carrier office 101 again knows not to expect a second sequence to be outpulsed.

If a second outpulsed sequence is expected, the carrier office 101 awaits receipt of that sequence, as indicated in block 1109. If the second sequence is not received by the carrier office 101 within a predetermined period of time, the carrier office 101 treats this as an error, as indicated in block 1110, and deals with it accordingly.

As indicated in block 1111, if the second sequence is received in a timely manner or is not expected, the interexchange carrier office 101 transmits a second wink, referred to as an acknowledgment wink, on the trunk 132 to signal the end office 100 that the expected sequence or sequences have been received. The carrier office 101 then continues with call processing in a conventional manner, as suggested by block 1112.

Returning to FIG. 10, the end office 100 monitors the trunk 132, awaiting the acknowledgment wink, as suggested by block 1016. If the acknowledgment wink is not received by the end office 100 within a predetermined period of time after outpulsing has been completed, the end office 100 releases the trunk 132, as indicated in block 1017, and takes steps to block the call, as indicated in block 1018, such as connecting the customer to an appropriate announcement from the announcement system 121.

But if a timely acknowledgment wink is received at the end office 100, it is taken as an acknowledgment of the receipt by the interexchange carrier office 101 of the one or two outpulsed sequences of signals. In response, the end office 100 removes signaling equipment, such as the MF transmitter 128, from the trunk 132 and cuts through, i.e., completes, the communication path reserved through the terminal link network 104 and the trunk link network 105 between the originating terminal link 127 and the trunk 132, as indicated in block 1019, leaving the interexchange carrier office 101 to complete the call in the conventional manner. As far as the end office 100 is concerned, the call has been established, and the end office 100 terminates call set-up activities, as suggested by block 1020. Henceforth the call is treated by the end office 100 in a conventional manner, as indicated in block 317 of FIG. 3.

The case of the electronic end office 100, or access tandem acting as an end office, having direct trunk 132 connection to the interexchange carrier office 101, and routing an international call, is described next. The international call initially proceeds just like the domestic call, up to the block 1005 in FIG. 10 and the block 1104 in FIG. 11.

Returning to a consideration of block 1005 of FIG. 10, if the call is an international call, signaling proceeds in two stages, and the stage of signaling that includes the ANI-type sequence is preceded by a routing sequence, as suggested by block 1007. In the case of the international call, the routing sequence specifies routing information to the international carrier or to the interexchange carrier that is selected to transport the call to the international carrier.

For a direct-dialed international call outside of the conventional North American world zone 1, the routing sequence outpulsed by the end office is

KP+1N/N'X+XXX+CCC+ST where 1N/N'X represents a plurality of 1NX and 1N'X codes that begin with 1 and have a middle digit that is not 0 or 1, and where N and N' are used to distinguish between direct-dialed and operator-assisted calls. The 1N/N'X codes are special cases of the ZZZ codes mentioned previously and identify the call as an international call. XXX contains the identification of the international carrier that is to handle the call; and CCC is the county code padded to three digits with leading zeros. The unpadded country code may not begin with the digits 0 or 1.

For direct-dialed international calls inside world zone 1 but outside of the continental United States, i.e., INC EXCEPTED codes, identified by nonzero values of the GWID 623 of this Rate and Route Pattern 611 (see FIG. 6), the end office outpulses the sequence

KP+1N/N'X+XXX+01R+ST where 01R is a three digit sequence consisting of the 1 country code padded with a leading zero, and where R is the value of the GWID 623 and distinguishes among calls to various regions of world zone 1 outside of the Continental United States.

For a cut-through call, i.e., one dialed on a 10XXX+# basis, if permitted, to an international carrier, the end office outpulses the sequence

KP+1NX+XXX+000+ST, and for a call to an international operator, i.e., one dialed on 10XXX+0 basis, the end office outpulses the sequence

KP+1N'X+XXX+000+ST.

No provision is made in this example for dialing an international carrier who is also not an interexchange carrier on a 950-1XXX basis. The above-described situations are summarized in Table Z.

TABLE Z

| SITUATION DIALED ( ) Indicates Optional Digits | STAGE | OUTPULSING SEQUENCE ( ) Indicates Optional Digits for ANI Option |
|---|---|---|
| (10XXX)+ 011+CC+ NN | 1 | KP+1NX+XXX+CCC+ST |
|  | 2 | KP+(II+ANI)+ST+ KP+CC+NN+ST |
| (10XXX)+ 01+CC+ NN | 1 | KP+1N'X+XXX+CCC+ST |
|  | 2 | KP+(II+ANI)+ST+ KP+CC+NN+ST |
| (10XXX)+ (1)+10D | 1 | KP+1NX+XXX+01R+ST |
|  | 2 | KP+(II+ANI)+ST+ KP+10D+ST |
| (10XXX)+ 0+10D | 1 | KP+1N'X+XXX+01R+ST |
|  | 2 | KP+(II+ANI)+ST+ KP+0+10D+ST |
| 10XXX+# | 1 | KP+1NX+XXX+000+ST |
|  | 2 | KP+(II+ANI)+ST' |
| 10XXX+0 | 1 | KP+1N'X+XXX+000+ST |
|  | 2 | KP+(II+ANI)+ST+ KP+0+ST |

Returning now to block 1102 of FIG. 11, the outpulsed sequence is received and collected at the interexchange or transport interexchange carrier office 101. The received sequence is used by a transport interexchange carrier to properly route the call to the designated international carrier. The sequence also provides an international carrier with initial routing information, such as the destination country and whether operator assistance is required.

As suggested by the block 1104, the sequence is examined by the carrier office 101 for the presence of the 1N/N'X code that identifies the call as an international call. The call is so identified, and the carrier office 101 responds by returning a second wink to the end office 100 over the trunk 132, as indicated in block 1105.

Returning to FIG. 10, the end office 100 monitors the trunk 132 awaiting receipt of the second wink, as indicated in block 1008. If the wink is not received within a predetermined time period, the end office 100 releases the trunk 132, as indicated in block 1009, by returning it to the on-hook state. As indicated in block 1010, the end office 100 also takes steps necessary to block the call, such as connecting the terminal link 127 to an appropriate announcement. But if the end office 100 does receive a timely second wink, it responds thereto by commencing the second stage of outpulsing at the block 1011. Processing of the call henceforth proceeds in a manner directly analogous to that described above for a domestic call.

As indicated in the block 1011, the ANI-type sequence is next outpulsed by the end office. The ANI-type sequences for the various international situations are directly analogous to those for like domestic calls, and are summarized in the Table Z.

If the international call is direct-dialed and overlap outpulsing is allowed, outpulsing is commenced when the country code of the called number is dialed by the caller and recognized by the end office 100. Hence at the end of outpulsing of the ANI-type sequence, the end office 100 may have to wait for dialing to be completed, as indicated by the blocks 1012 and 1013. As in the case of the domestic call, however, there may not be a called number, as indicated by block 1014, in which case no wait is involved.

Assuming that a called number does exist, the end office 100 outpulses on the trunk 132 a sequence indicative of that called number, as suggested by block 1015. If the call is a direct-dialed international call outside of world zone 1, irrespective of whether operator assistance was requested, the end office 100 outpulses

KP+CC+NN+ST where CC is the country code and NN is the national directory number. CC+NN generally comprise 7 to 12 digits and represent the called international number.

If the call is a direct-dialed international call inside world zone 1, the end office outpulses the sequence

KP+(0)+10D+ST where 10D are the 10 digits of the called number, and where 0 is outpulsed only if 0 was dialed before the called number to request operator assistance.

If the call does not specify who is being called, i.e., the call is a cut-through call dialed as 10XXX+#, a called number is not available and hence the called number sequence is omitted. These situations once again are summarized in Table Z.

As indicated by blocks 1016–1020, the end office 100 thereafter again waits for the receipt of the acknowledgment wink and completes call path setup activities in the manner described above for domestic calls, thereafter returning to processing the call in a conventional manner.

Returning to FIG. 11, following its transmission of the second wink to the end office 100 at block 1105, the carrier office 101 monitors the trunk 132, awaiting receipt of the ANI-type sequence, as indicated in block 1106. If the sequence is not received by the carrier office 101 within a predetermined period of time, the carrier office 101 treats the matter as an error and accords it error treatment, as indicated in block 1107.

If the carrier office 101 does receive the outpulsed sequence in a timely manner, it examines the information conveyed thereby to determine whether it should expect to receive another sequence, as indicated in block 1108. The examination is made in the manner described above for domestic calls.

If a third outpulsed sequence is expected, the carrier office 101 awaits receipt thereof, as indicated in the block 1109. If the third sequence is not received by the carrier office 101 within a predetermined period of time, the carrier office treats this as an error, as indicated in the block 1110, and deals with it accordingly.

As indicated in block 1111, if the third sequence is received in a timely manner or is not expected, the carrier office 101 returns an acknowledgment wink to the end office 100 to signal that the expected sequence or sequences of the second stage of signaling have been received. The carrier office 101 then processes the call in a conventional manner based on the information received.

Considering now the situation of an end office not equipped to provide the above-described type of signaling protocol, it can handle calls sought to be routed via an interexchange carrier other than the original interexchange carrier only via the conventional scheme of 950-1XXX dialing. Such an end office may likewise communicate with a carrier office 101 over direct or indirect trunks 132. In the case of a direct trunk 132 connection, the end office and the carrier office communicate according to the conventional protocol existing for 950-1XXX calls. The call path is then set up and the call is completed in a conventional manner.

Figure 12A:
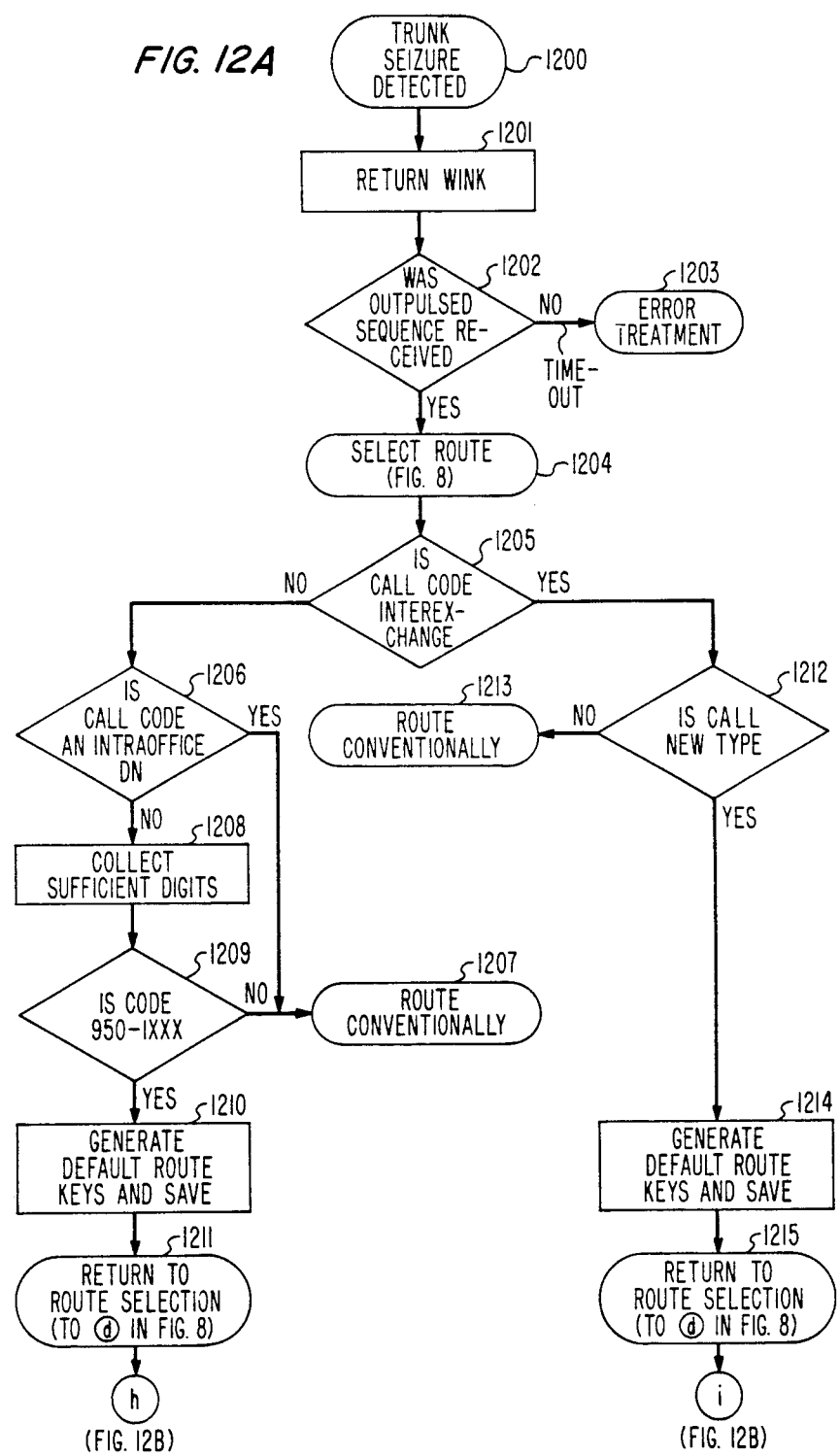

The case of the indirect trunk 132 connection between the end office and the interexchange carrier is examined next, in conjunction with FIGS. 10–12. In the case of the indirect trunk 132 route, the access tandem 98 acts as an interface between the end office 100 and the interexchange carrier office 101. It appears as an end office 100 from the viewpoint of the interexchange carrier office 101, and hence the protocol followed by the carrier office 101 is as shown in FIG. 11. However, the end office 100 is aware that it is communicating with the access tandem 98 and not the interexchange carrier office 101. From the viewpoint of the end office 100, the access tandem 98 is analogous to a transport interexchange carrier in the case of an international call: the access tandem 98 is an intermediary, an interface, between the end office 100 and the carrier 101 just as the transport carrier 101 is an intermediary between the end office 100 and the international carrier office 101. In both cases the end office 100 must supply to the intermediary information required for routing the call to the final carrier. Hence, the protocol followed by the end office 100 in the domestic-call indirect-trunk 132 connection case is analogous to that followed by the end office 100 for an international call. In the case of an international call, the protocol is the same for both direct and indirect trunk 132 connections, as the same routing information must be supplied by the end office 100 in both situations.

The procedure followed by the end office 100 is once again as shown in FIG. 10. When required to set up an indirect call path, the end office 100 selects a trunk 132 to the access tandem 98 and seizes it, as indicated in block 1001, in the conventional manner. The end office 100 then awaits receipt of the standard wink from the access tandem 98, as suggested at the block 1002.

Turning to FIG. 12, the access tandem 98 monitors incoming trunks 132 and when it detects seizure of one of them, as indicated by block 1200, it prepares to receive signaling thereon, in the conventional manner. When ready, the access tandem 98 returns the standard wink across the trunk 132 to the end office 100, as indicated in block 1201, all in a conventional manner.

Returning to FIG. 10, upon receipt of the standard wink, the end office 100 outpulses to the access tandem 98 a routing sequence whether or not the call is a domestic or an international call, as suggested by blocks 1005-1007.

In the case of the international call, the end office 100 outpulses to the access tandem 98 the routing sequence

KP+1N/N'X+XXX+3D+ST.

This sequence has been discussed above in conjunction with international calls. 3D here stands for one of the three digit sequences CCC, 01R, or 000, as shown in Table Z.

In the case of the domestic call, the end office 100 outpulses to the access tandem 98 the routing sequence

KP+ZZZ+XXX+ST, where the ZZZ code is as previously discussed. The ZZZ digits, including the 1N/N'X digits, are chosen from available spare toll center codes in the access tandem 98. XXX once again contains the carrier ID code.

Turning again to FIG. 12, following the transmittal of the wink, the access tandem 98 monitors the trunk 132, waiting for the end office 100 to outpulse a sequence of MF signals, as suggested by block 1202. If an outpulsed sequence is not received by the access tandem 98 within a predetermined period of time, the access tandem 98 treats the trunk seizure detected in the block 1200 as an error, as indicated by block 1203, and deals with it in a conventional manner. If the access tandem 98 receives the outpulsed sequence in a timely manner, it enters the call analysis of FIG. 8 with the received three digit code, in this case the ZZZ-type (i.e., including 1N/N'X) code that follows the KP code and with the number of the incoming trunk group of which the calling trunk 132 is a member, to select a route through the switching system for the call, as suggested by block 1204.

Pausing to consider the case of an end office 100 not equipped to provide the above-described type of signaling protocol, as was mentioned previously, such an end office 100 can handle calls sought to be routed on an equal basis to an interexchange carrier's office 101 via the conventional scheme of 950-1XXX dialing.

In the case of an indirect trunk 132 connection of such an end office 100 to the interexchange carrier office 101, the end office 100 establishes a trunk 132 connection to the access tandem 98 in a conventional manner. When the access tandem 98 detects the trunk seizure and returns a wink, as indicated in the blocks 1200-1201 of FIG. 12, the end office 100 outpulses to the access tandem 98 the sequence

KP+950+1XXX+ST and then cuts through the communication path between the trunk 132 leading to the access tandem 98 and the terminal link 127.

If the access tandem 98 receives the outpulsed sequence in a timely manner, it enters the call analysis of FIG. 8 with the received three-digit code, in this case the 950 code that follows the KP code, and with the number of the trunk group of the incoming trunk 132, to select a route through the switching system for the call, again as suggested by block 1204.

Returning to a consideration of FIGS. 6 and 8, when the access tandem 98 enters the call analysis of FIG. 8, in the manner previously described, the access tandem 98 performs translations of the three digit code and of the incoming trunk group number, at the block 801, to obtain the Rate and Route Pattern 611 and the Trunk Group relation 413 information, respectively, including the CIRPOPT 625 and the SuppTG 424, respectively. The access tandem 98 then performs conventional screening at the block 802. If the call is found to be valid, the call is determined to be an incoming trunk call at the block 805, by virtue of it coming into the access tandem 98 on a trunk 132, and call processing is returned to at the block 806.

Considering again FIG. 12, upon return from the call analysis of FIG. 8, a check must be made to determine whether the call is designated as an interexchange call, as shown in block 1205. This can be done by checking the CIRID 622 of the Rate and Route Pattern 611 (see FIG. 6) that is associated with the three digit code that was translated at the block 1204. If the call is not designated as being interexchange, a check is made, of information conventionally stored in the data base, to determine if the code is a directory number assigned to the switching office 98, as indicated in block 1206. If the call code is a directory number assigned to the access tandem 98, it is an indication that the call is not an indirectly routed call to a carrier, but rather is a conventional call. For example, the call may be terminating at the access tandem 98. The access tandem 98 responds by routing the call conventionally, as appropriate for that code, as suggested in block 1207.

If the call code is not a directory number assigned to the access tandem 98, the call may be a 950-1XXX call from an office not equipped to carry on the signaling protocol of FIG. 10, and the access tandem 98 collects and examines other digits incoming over the trunk 132 to determine if the call is indeed a 950-1XXX call, as indicated in blocks 1208-1209. If the call is not a 950-1XXX call, it is again an indication that the call is not an indirectly-routed call to a carrier but rather is some conventional call, and the access tandem 98 responds by routing the call conventionally, as appropriate for that call code, as suggested by the block 1207.

If, however, the call is found to be a 950-1XXX call in the block 1209, the access tandem 98 responds by generating the default values RLO 672$d$, RLS 673$d$, and RLI 674$d$ that are appropriate for a 950-1XXX type call, as suggested in block 1210, in a manner directly analogous to that discussed for an end office 100 in conjunction with the block 311 of FIG. 3. As indicated in block 1211, the access tandem 98 then returns to the route-selection process of FIG. 8, at the block 846.

Returning to a consideration of the block 1205, if the call is there found to be designated as interexchange, a check is made to determine if the call is of a new call type, as indicated in block 1212. Referring to FIG. 6, this check is made by examining the CALL TYPE indicator 642 that is included in the route descriptor 621 of the Rate and Route Pattern 611 associated with the three digit code that was translated at the block 1204. If the indicator 642 does not indicate a new call type, it means, inter alia, that the new MF signaling protocol is not used in establishing a route for the call, and the access tandem 98 responds by establishing the route for the call in a conventional manner appropriate for that particular call, as indicated by block 1213.

If, however, the call is indicated to be of the new call type, the access tandem 98 responds by generating the default values RLO 672$d$, RLS 673$d$, and RLI 674$d$ that are appropriate for an interexchange call routed via an access tandem, as suggested in block 1214. As indicated in block 1215, the access tandem 98 then returns to the call-route selection process of FIG. 8 at the block 846.

Returning to a consideration of FIG. 8, as was explained in the discussion of the end office-type case at the block 846, computations are performed to obtain identifiers of Route List routes that can serve as alternatives to the default route identified by the default Route List identifier comprising the previously generated default route keys 672d–674d, and the results are likewise stored in the scratch pad 512. For an explanation of the computations, reference is made to FIG. 9B, which shows a logical layout of a portion of the scratch pad 512 that is associated with the data base.

As was explained in conjunction with the blocks 1210 and 1214 of FIG. 12, in the case of the access tandem 98 acting in its access tandem capacity, default keys 672d–674d were generated and stored in the scratch pad 512. As indicated in FIG. 9B, the RLO 672d, RLS 673d, and RLI 674d are stored in the first word 901 of the scratch pad 512, along with the XXX key 671 formed either by the XXX carrier code that was transmitted to the access tandem 98 as part of the routing sequence, or by the XXX carrier code that was received by the access tandem 98 as part of the 950-1XXX call. The contents of the first word 901 define the default Route List route identifier.

As was further explained in conjunction with the block 801, in the access tandem case, translations of the three digit code and the incoming trunk group number retrieve from the data base, inter alia, an optional CIRPOPT 625 and a SuppTG 424, whose contents are then stored in the scratch pad 512. The values, if any, of the keys 671–674 that are retrieved from the CIRPOPT 625 and the SuppTG 424 are now used to modify the default Route List route identifier and thus to form alternative Route List route identifiers. In the access tandem-type of case, any of the key values 672c–674c that are defined in the SuppTG 424 take precedence over any of the key values 671a–674a that are defined in the CIRPOPT 625 and the default values 671d–674d. Any of the key values 671b–674a in turn take precedence over any of the default values 671d–674d. Therefore any defined key values 671c–674c are substituted for the default values 671d–674d any defined key values 671a–674a, are substituted for any remaining default values 671d–674d, and the result is stored in a fourth word 904 of the scratch pad 512 to form therein a first alternative Route List route identifier. In direct analogy to the end office type case, often the CIRPOPT 625 of the Rate and Route Pattern 611 defines a value for the RLI 674a, but commonly the CIRPOPT 625 does not exist. The SuppTG 424 of the Trunk Group relation 413 generally defines a value for the RLS 673c. Hence, as shown in FIG. 9B, the first alternative Route List route identifier of the fourth word 904 commonly comprises the RLO 672d, RLS 673c, and RLI 674d.

A second alternative Route List identifier is formed by substituting any defined key values 671a–674a for the default values 671d–674d, and is stored in the third word 903 of the scratch pad, as shown in FIG. 9B. As the CIRPOPT 625 generally only defines the RLI 674a and most commonly does not exist, the second alternative Route List route identifier of the third word 904 generally comprises the RLO 672d, RLS 672d, and either the RLI 674a or the RLI 674d.

A third alternative Route List route identifier is formed by setting the value of the RLI 674 of the second Route List route identifier to zero, and it is stored in the second word 902 of the scratch pad, as shown in FIG. 9B.

Returning to consideration of FIG. 8, when the alternative Route List route identifiers have been computed, at the block 846, the check at the block 847 finds the carrier to be of the appropriate type in the access tandem case, unless an error has occurred. The carrier code XXX that the access tandem 98 received as part of the routing sequence is then substituted into the field 671 of the words 901–904 of the scratch pad 512 to complete formation of the Route List route identifiers. The update of the Route List identifiers in the scratch pad 512 with the carrier's XXX code, at block 855, generally causes no change in the access tandem case, as the translations of the ZZZ-type or 950 codes and of the incoming trunk group generally will have returned a null in the XXX fields 671 of the CIRPOPT 625 and SuppTG 424.

Following the check at the block 856, the Route List route identifiers of FIG. 9B are used to obtain a route for the call, in a manner analogous to that described for the end office type case in conjunction with the blocks 861–866, starting with the first alternative Route List route identifier of the fourth scratch pad word 904. If one of the Route List route identifiers does lead to a defined route, the descriptor 721 of that route is retrieved from the Route Lists 750 and is stored in the scratch pad 512, as indicated in the blocks 866 and 871. In the access tandem-type of situation, conventional steps are then taken to permit routing of the call according to the retrieved route descriptor 721, as indicated in block 872. Call processing is then continued, as indicated in block 873. Upon return to call processing, the route for the call is established, if possible, according to the route descriptor 721.

Returning to consideration of FIG. 12, the route descriptor 721 specifies the route to be followed by the call in a conventional manner, by specifying the direct trunk group to the carrier office 101 over which the call should be routed from the access tandem 98. The selection of a trunk 132 from that trunk group and connection thereto is accomplished by the access tandem 98 in the conventional manner. Should a route to the interexchange carrier office 101 not be available, the access tandem 98 treats that situation by returning an off-hook signal to the end office 100 and blocking the call. It will be assumed below that a trunk 132 leading to the carrier office 101 is available.

Along with the call route, the route descriptor 721 specifies the procedure to be followed by the access tandem 98 in establishing the route. As can be seen in FIG. 12 from blocks 1216 et seq. and blocks 224 et seq., the procedures are indeed different for calls incoming to the access tandem 98 from end offices unequipped for the new signaling, i.e., 950-1XXX type calls, and for calls incoming under the protocol of FIG. 10, respectively.

Considering first the case of a call incoming from the end office 100 equipped to engage in the signaling scheme of FIG. 10, in manner like that described above for the end office 100 the access tandem 98 seizes the selected trunk 132 to the carrier office 101, as indicated in block 1224, by applying an off-hook signal thereto. The access tandem 98 then awaits receipt of a standard wink from the interexchange carrier office, as suggested by block 1225.

Referring to FIG. 11, the interexchange carrier office 101 responds to the trunk 132 seizure in the manner described above and returns a wink to the access tandem when it is ready to receive signaling, as indicated in the blocks 1100–1101.

Returning to FIG. 12, the access tandem 98 waits for the wink from the carrier office 101 for a predetermined period of time. If the wink is not received, the access tandem 98 releases the trunk 132 connecting it to the carrier office 101, as shown in block 1221, returns an off-hook signal to the end office 100, as shown in block 1222, and blocks the call, as indicated in block 1223, for example by connecting the trunk 132 that leads to the end office 100 to an appropriate announcement, all in a conventional manner.

Referring back to FIG. 10, the end office 100 is awaiting receipt of the wink at the block 1008. But, as shown by block 1021, the end office 100 recognizes the off-hook signal and responds to it by setting up the talking path between the access tandem 98 and the terminal link 127, without signaling or sending of any digit sequences, in order for the subscriber to hear the announcement from the access tandem 98. As far as the end office 100 is concerned, the call has been established, and the end office 100 terminates call setup activities and returns to conventional call processing as suggested by block 1022.

Returning to the block 1225 of FIG. 12, if the access tandem 98 receives a wink from the carrier office 101 within the specified time, the access tandem 98 responds differently to international and to domestic calls, as suggested by block 1226. If the call is international, as indicated by the 1N/N'X digits of the routing sequence, the access tandem 98 repeats the routing sequence to the international carrier office 101, as indicated in block 1227. The access tandem 98 then awaits a wink from the carrier office 101 acknowledging receipt of the routing sequence, as suggested in block 1228.

Turning to FIG. 11, the carrier office 101 receives the routing sequence, recognizes it as such, acknowledges receipt thereof by returning a wink to the access tandem 98, and begins a timed wait for the next sequence that it expects the access tandem 98 to outpulse, as indicated in blocks 1102–1106.

Referring again to FIG. 12, if the access tandem 98 does not receive from the carrier office 101 the post-routing sequence wink within a predetermined period of time, it treats the call as indicated in blocks 1221–1223 and described above. In such a case the end office 100 once again responds as described and shown in the blocks 1021 and 1022 of FIG. 10.

If the access tandem 98 does receive a timely wink from the carrier 101 at the block 1228, or if the call is determined to not be an international call at the block 1226, the access tandem 98 cuts through the communication path between the trunk 132 leading to the end office 100 and the trunk 132 leading to the interexchange carrier office 101, as indicated in block 1229, in a conventional manner. The access tandem 98 then repeats to the end office 100 the wink that it received from the carrier office 101, as indicated in block 1230.

As far as the access tandem 98 is concerned, the call path has been established and the access tandem 98 terminates call-setup activities, and henceforth processes the call in a conventional manner, as indicated in block 1231.

Returning to FIG. 10, upon receipt of the second wink, at the block 1008, the end office 100 knows that it has a direct communication path to the carrier office 101. The end office 100 therefore proceeds to communicate with the carrier office 101 via the same protocol, and proceeds to transfer to the carrier office 101 the same information, as in the case of a direct trunk 132 connection, as was described above in conjunction with the blocks 1011–1020 of FIG. 10 and the block 317 of FIG. 3. The carrier office 101 in turn responds to the end office 100 in the manner shown in the blocks 1108–1112 of FIG. 11 and described above.

Considering next the continuation of the case of a call incoming to the access tandem 98 on a 950-1XXX basis, following return from call analysis of FIG. 8, the access tandem 98 proceeds to select and seize a trunk 132 based on information supplied by the route descriptor 721, and to await a wink from the interexchange carrier office 101, as indicated in blocks 1216–1217.

As was described above in conjunction with the blocks 1100–1102 of FIG. 11, the carrier office 101 responds to the trunk seizure by sending a wink and waiting to receive an outpulsed sequence from the access tandem 98.

Returning to FIG. 12, upon receipt of the wink, the access tandem 98 outpulses the sequence $$KP+ST''$$

to the interexchange carrier office 101 to inform it that this is a call from an end office 100 unequipped for the new signaling, as suggested in block 1218. The access tandem 98 then awaits receipt of the acknowledgment wink from the carrier office 101, as indicated in block 1219, and gives the call the treatment described above in conjunction with the blocks 1221–1223 if a timely wink is not received.

Turning to FIG. 11, when the carrier receives the outpulsed sequence, at the block 1102, and examines it, it learns from the ST'' code to not expect a second outpulsed sequence. Hence, the carrier office 101 returns an acknowledgment wink on the trunk 132 leading to the access tandem 98, as indicated in the block 1111.

Again, returning to FIG. 12, when the access tandem 98 receives the acknowledgment wink at the block 1219, it cuts-through the communication path between the end office 100 and the interexchange carrier office 101, as shown in block 1220. The call path is thus established between the terminal link 127 and the carrier office 101. As far as the access tandem 98 is concerned, the call has been completed, and the access tandem 98 terminates call-setup activities and henceforth processes the call in the conventional manner, as indicated in the block 1231.

Of course, various changes and modifications to the illustrative embodiment described above will be apparent to those skilled in the art. Such changes and modifications can be made without departing from the spirit and the scope of the invention and without diminishing its attendant advantages. It is therefore intended that such changes and modifications be covered by the following claims.

What is claimed is:

1. A method of establishing at a first telephone switch a communication path between the first switch and a second telephone switch, for a call connected to the first telephone switch, comprising the steps of:

transmitting a first signal on a selected communication path leading from the first switch to the second switch;

receiving on the selected path a second signal responsive to the first signal;

transmitting call-characterizing information on the selected path, in response to the second signal;

receiving on the selected path a third signal acknowledging the call-characterizing information; and connecting the call to the selected path for communication, in response to the third signal.

2. The method of claim 1 wherein the first switch is an end office switch, the second switch is an interexchange-carrier switch, and the call is a domestic call; and wherein the step of transmitting a first signal on a selected communication path leading from the first switch to the second switch comprises the step of transmitting a trunk-seizure signal on a selected trunk leading from the end office switch to the interexchange-carrier switch.

3. The method of claim 1 wherein the step of transmitting call-characterizing information comprises the steps of:

transmitting a first information sequence, of information characterizing a source of the call; and selectively transmitting a second information sequence, of information characterizing a destination of the call.

4. A method of establishing at a first telephone switch a communication path between the first telephone switch and a second telephone switch for a call originating at the first telephone switch, comprising the steps of:

seizing a selected trunk connecting the first switch with the second switch;

receiving on the selected trunk a first wink responsive to the trunk seizure;

transmitting on the selected trunk a first information sequence, of information characterizing a source of the call and identifying or not the source of the call, in response to the first wink;

transmitting or not on the selected trunk a second information sequence, or information identifying a destination of the call, in response to the first wink;

receiving on the selected trunk an acknowledgement wink acknowledging the first information sequence and, if transmitted, also the second information sequence; and cutting-through a call path to the selected trunk, in response to the acknowledgment wink.

5. The method of claim 4 wherein the first switch is an end office switch, the second switch is an interexchange-carrier switch, and the call is a domestic call; and wherein the step of seizing a selected trunk connecting the first switch with the second switch comprises the step of transmitting a trunk-seizure signal on a selected trunk connecting the end office switch with the interexchange-carrier switch.

6. A method of establishing at a first telephone switch a communication path between the first switch and a second telephone switch for a call connected to the first telephone switch, comprising the steps of:

transmitting a first signal on a selected communication path leading from the first switch to the second switch;

receiving on the selected path a second signal responsive to the first signal;

transmitting a first set of call-characterizing information on the selected path, in response to the second signal;

receiving on the selected path a third signal responsive to the first set of call-characterizing information;

transmitting a second set of call-characterizing information on the selected path, in response to the third signal;

receiving on the selected path a fourth signal acknowledging the second set of call-characterizing information; and connecting the call to the selected path for communication, in response to the fourth signal.

7. The method of claim 6 wherein the first switch is an end office switch, the second switch is an interexchange-carrier switch, and the call is an international call; and wherein the step of transmitting a first signal on a selected communication path leading from the first switch to the second switch comprises the step of transmitting a trunk-seizure signal on a selected trunk leading from the end office switch to the interexchange-carrier switch.

8. The method of claim 6 wherein the first switch is an end office switch and the second switch is an access tandem switch for interfacing the call to an interexchange-carrier switch; and wherein the step of transmitting a first signal on a selected communication path leading from the first switch to the second switch comprises the step of transmitting a trunk-seizure signal on a selected trunk leading from the end office switch to the access tandem switch.

9. The method of claim 6 wherein the step of transmitting a first set of call-characterizing information comprises the step of:

transmitting a first information sequence, of information characterizing a route of the call from the second switch to a third switch.

10. The method of claim 6 wherein the step of transmitting a second set of call-characterizing information comprises the steps of:

transmitting a second information sequence, of information characterizing a source of the call; and transmitting or not a third information sequence, of information characterizing a destination of the call.

11. A method of establishing at a first telephone switch a communication path between the first telephone switch and a second telephone switch for a call orginating at the first telephone switch, comprising the steps of:

seizing a selected trunk connecting the first switch with the second switch;

receiving on the selected trunk a first wink responsive to the trunk seizure;

transmitting on the selected trunk a first information sequence, of information identifying an interexchange carrier for the call and characterizing a route of the call from the second switch to a switch of the identified carrier, in response to the first wink;

receiving on the selected trunk a second wink responsive to the first information sequence;

transmitting on the selected trunk a second information sequence, of information characterizing the call and identifying or not a source of the call, in response to the second wink;

transmitting or not on the selected trunk a third information sequence, of information identifying a destination of the call, in response to the second wink;

receiving on the selected trunk an acknowledgement wink acknowledging the second information sequence and, if transmitted, also the third information sequence; and cutting-through a call path to the selected trunk, in response to the acknowledgement wink.

12. The method of claim 11 wherein the first switch is an end office switch, the second switch is an interexchange-carrier switch, and the call is an international call; and wherein the step of seizing a selected trunk connecting the first switch with the second switch comprises the step of transmitting a trunk-seizure signal on a selected trunk connecting the end office switch with the interexchange-carrier switch.

13. The method of claim 11 wherein the first switch is an end office switch and the second switch is an access tandem switch for interfacing the call to an interexchange-carrier switch; and wherein the step of seizing a selected trunk connecting the first switch with the second switch comprises the step of transmitting a trunk-seizure signal on a selected trunk connecting the end office switch with the access tandem switch.

14. A method of establishing at a second telephone switch a communication path between a first telephone switch and the second telephone switch for a call connected to the first telephone switch, comprising the steps of:

receiving a first signal on a communication path leading from the second switch to the first switch;

transmitting on the path a second signal, in response to the first signal;

receiving call-characterizing information on the path responsive to the second signal; and transmitting on the path a third signal acknowledging receipt of the call-characterizing information, to cause connection of the call to the path for communication.

15. The method of claim 14 wherein the first switch is an end office switch, the second switch is an interexchange-carrier switch, and the call is a domestic call; and wherein the step of receiving a first signal on a communication path leading from the second switch to the first switch comprises the step of receiving a trunk-seizure signal on a trunk leading from the interexchange-carrier switch to the end office switch.

16. The method of claim 14 wherein the first switch is an access tandem switch for interfacing the call to the second switch, the second switch is an interexchange-carrier switch, and the call is a domestic call originating at an end office switch; and wherein the step of receiving a first signal on a communication path leading from the second switch to the first switch comprises the step of receiving a trunk-seizure signal on a trunk leading from the interexchange-carrier switch to the access tandem switch.

17. A method of establishing at a second telephone switch a communication path between a first telephone switch and the second telephone switch for a call connected to the first telephone switch, comprising the steps of:

detecting seizure of a trunk connecting the first switch with the second switch;

transmitting on the trunk a first wink, in response to the seizure;

receiving on the trunk a first information sequence, of information characterizing a source of the call and identifying or not the source of the call, responsive to the first wink;

receiving or not on the trunk a second information sequence, of information identifying a destination of the call, responsive to the first wink; and transmitting on the trunk an acknowledgment wink acknowledging receipt of the first information sequence and, if received, also the second information sequence, to cause cut-through of a call path to the trunk.

18. The method of claim 17 wherein the first switch is an originating end office switch, the second switch is an interexchange-carrier switch, and the call is a domestic call; and wherein the step of detecting seizure of a trunk connecting the first switch with the second switch comprises the step of receiving a trunk-seizure signal on a trunk connecting the originating end office switch with the interexchange-carrier switch.

19. The method of claim 17 wherein the first switch is an access tandem switch for interfacing the call to the second switch, the second switch is an interexchange-carrier switch, and the call is a domestic call originating at an end office switch; and wherein the step of detecting seizure of a trunk connecting the first switch with the second switch comprises the step of receiving a trunk-seizure signal on a trunk connecting the access tandem switch with the interexchange-carrier switch.

20. A method of establishing at a second telephone switch a communication path between a first telephone switch and the second telephone switch for a call connected to the first telephone switch, comprising the steps of:

receiving a first signal on a communication path leading from the second switch to the first switch;

transmitting on the path a second signal, in response to the first signal;

receiving on the path a first set of call-characterizing information responsive to the second signal;

transmitting on the path a third signal responsive to receipt of the first set of call-characterizing information;

receiving on the path a second set of call-characterizing information responsive to the third signal; and transmitting on the path a fourth signal acknowledging receipt of the second set of call-characterizing information, to cause connection of the call to the path for communication.

21. The method of claim 20 wherein the first switch is an end office switch, the second switch is an interexchange-carrier switch, and the call is an international call; and wherein the step of receiving a first signal on a communication path leading from the second switch to the first switch comprises the step of receiving a trunk-seizure signal on a trunk leading from the interexchange-carrier switch to the end office switch.

22. The method of claim 20 wherein the first switch is an access tandem switch for interfacing the call to the second switch, the second switch is an interexchange-carrier switch, and the call is an international call originating at an end office switch; and wherein the step of receiving a first signal on a communication path leading from the second switch to the first switch comprises the step of receiving a trunk-seizure signal on a trunk leading from the interexchange-carrier switch to the access tandem switch.

23. A method of establishing at a second telephone switch a communication path between a first telephone switch and the second telephone switch for a call connected to the first telephone switch, comprising the steps of:
detecting seizure of a trunk connecting the first switch with the second switch;
transmitting on the trunk a first wink, in response to the seizure;
receiving on the trunk a first information sequence, of information identifying an interexchange carrier for the call and characterizing a route of the call from the second switch to a switch of the identified carrier, responsive to the first wink;
transmitting on the trunk a second wink responsive to receipt of the first information sequence;
receiving on the trunk a second information sequence, of information characterizing a source of the call and identifying or not the source of the call, responsive to the second wink;
receiving or not on the trunk a third information sequence, of information identifying a destination of the call, responsive to the second wink; and
transmitting on the trunk an acknowledgment wink acknowledging receipt of the second information sequence and, if received, also the third information sequence, to cause cut-through of a call path to the trunk.

24. The method of claim 23 wherein the first switch is an originating end office switch, the second switch is an interexchange-carrier switch, and the call is an international call; and
wherein the step of detecting seizure of a trunk connecting the first switch with the second switch comprises the step of receiving a trunk-seizure signal on a trunk connecting the end office switch with the interexchange-carrier switch.

25. The method of claim 23 wherein the first switch is an access tandem switch for interfacing the call to the second switch, the second switch is an interexchange-carrier switch, and the call is an international call originating at an end office switch; and
wherein the step of detecting seizure of a trunk connecting the first switch with the second switch comprises the step of receiving a trunk-seizure signal on a trunk connecting the access tandem switch with the interexchange-carrier switch.

26. A method of establishing at a third telephone switch a communication path between a first telephone switch and a second telephone switch for a call connected to the first telephone switch, comprising the steps of:
receiving a first signal on a first communication path leading from the third switch to the first switch;
transmitting on the first path a second signal, in response to the first signal;
receiving on the first path a first set of call-characterizing information responsive to the second signal;
transmitting a third signal on a selected second communication path leading from the third switch to the second switch, in response to the first set of call-characterizing information received on the first path;
receiving on the second path a fourth signal responsive to the third signal;
connecting the first path to the second path for communication, in response to the fourth signal; and
transmitting on the first path a fifth signal in response to the fourth signal, to cause the first switch to connect the call to the first path for communication following transmittal by the first switch of a second set of call-characterizing information to the second switch and receipt by the first switch of an acknowledgment wink from the second switch.

27. The method of claim 26 wherein the first switch is an end office switch, the second switch is an interexchange-carrier switch, the third switch is an access tandem switch, and the call is a domestic call;
wherein the step of receiving a first signal on a first communication path leading from the third switch to the first switch comprises the step of receiving a trunk-seizure signal on a first trunk leading from the access tandem switch to the end office switch; and
wherein the step of transmitting a third signal on a selected second communication path leading from the third switch to the second switch comprises the step of transmitting a trunk-seizure signal on a selected second trunk leading from the access tandem switch to the interexchange-carrier switch.

28. A method of establishing at a third telephone switch a communication path between a first telephone switch and a second telephone switch for a call originating at the first telephone switch, comprising the steps of:
detecting seizure of a first trunk connecting the first switch with the third switch;
transmitting on the first trunk a first wink, in response to the seizure of the first trunk;
receiving on the first trunk a first information sequence, of information indenfying an interexchange carrier for the call and characterizing a route of the call from the third switch to the second switch, responsive to the first wink;
seizing a selected second trunk connecting the third switch with the second switch, in response to the first information sequence received on the first trunk;
receiving on the second trunk a second wink responsive to the seizure of the second trunk;
cutting-through the communication path between the first trunk and the second trunk, in response to the second wink; and
transmitting a third wink identical to the second wink on the first trunk to cause the first switch to cut-through a call path to the first trunk following transmittal by the first switch of at least a second information sequence, of call-characterizing information, to the second switch and receipt by the first switch of an acknowledgment wink from the second switch.

29. The method of claim 28 wherein the first switch is an end office switch, the second switch is an interexchange-carrier switch, the third switch is an access tandem switch, and the call is a domestic call;
wherein the step of detecting seizure of a first trunk connecting the first switch with the third switch comprises the step of receiving a trunk-seizure signal on a first trunk connecting the end office switch with the access tandem switch; and
wherein the step of seizing a selected second trunk connecting the third switch with the second switch comprises the step of transmitting a trunk-seizure signal on a selected second trunk connecting the access tandem switch with the interexchange-carrier switch.

30. A method of establishing at a third telephone switch a communication path between a first telephone switch and a second telephone switch for a call connected to the first telephone switch, comprising the steps of:

receiving a first signal on a first communication path leading from the third switch to the first switch;

transmitting on the first path a second signal, in response to the first signal;

receiving on the first path a first set of call-characterizing information responsive to the second signal;

transmitting a third signal on a selected second communication path leading from the third switch to the second switch, in response to the first set of call-characterizing information received on the first path;

receiving on the second path a fourth signal responsive to the third signal;

transmitting the first set of call-characterizing information on the second path, in response to the fourth signal;

receiving on the second path a fifth signal responsive to the first set of call-characterizing information;

connecting the first path to the second path for communication, in response to the fifth signal; and transmitting on the first path a sixth signal in response to the fifth signal, to cause the first switch to connect the call to the first path for communication following transmittal by the first switch of a second set of call-characterizing information to the second switch and receipt by the first switch of an acknowledgment wink from the second switch.

31. The method of claim 30 wherein the first switch is an end office switch, the second switch is an interexchange-carrier switch, the third switch is an access tandem switch, and the call is an international call;

wherein the step of receiving a first signal on a first communication path leading from the third switch to the first switch comprises the step of receiving a trunk-seizure signal on a first trunk leading from the access tandem switch to the end office switch; and wherein the step of transmitting a third signal on a selected second communication path leading from the third switch to the second switch comprises the step of transmitting a trunk-seizure signal on a selected second trunk leading from the access tandem switch to the interexchange carrier switch.

32. A method of establishing at a third telephone switch a communication path between a first telephone switch and a second telephone switch for a call originating at the first telephone switch, comprising the steps of:

detecting seizure of a first trunk connecting the first switch with the third switch;

transmitting on the first trunk a first wink, in response to the seizure of the first trunk;

receiving on the first trunk a first information sequence, of information identifying an interexchange carrier for the call and characterizing a route of the call from the third switch to the second switch, responsvie to the first wink;

seizing a selected second trunk connecting the third switch with the second switch, in response to the first information sequence received on the first trunk;

receiving on the second trunk a second wink responsive to the seizure of the second trunk;

transmitting the first information sequence on the second trunk in response to the second wink;

receiving on the second trunk a third wink responsive to the first information sequence;

cutting-through the communication path between the first trunk and the second trunk in response to the third wink; and transmitting a fourth wink identical to the third wink on the first trunk, to cause the first switch to cut-through a call path to the first trunk following transmittal by the first switch of at least a second information sequence, of call-characterizing information, to the second switch and receipt by the first switch of an acknowledgment wink from the second switch.

33. The method of claim 32 wherein the first switch is an end office switch, the second switch is an interexchange-carrier switch, the third switch is an access tandem switch, and the call is an international call;

wherein the step of detecting seizure of a first trunk connecting the first switch with the third switch comprises the step of receiving a trunk-seizure signal on a first trunk connecting the end office switch with the access tandem switch; and wherein the step of seizing a selected second trunk connecting the third switch with the second switch comprises the step of transmitting a trunk-seizure signal on a selected second trunk connecting the access tandem switch with the interexchange-carrier switch.

34. A first telephone switch for establishing a communication path between the first switch and a second telephone switch, for a call connected to the first telephone switch, comprising:

means for transmitting a first signal on a selected communication path leading from the first switch to the second switch;

means, operative subsequently to the means for transmitting a first signal, for receiving on the selected path a second signal following transmittal of the first signal;

means, operative subsequently to the means for receiving a second signal, for transmitting call-characterizing information on the selected path following receipt of the second signal;

means, operative subsequentially to the means for transmitting call-characterizing information, for receiving on the selected path a third signal acknowledging the call-characterizing information; and means, operative subsequentially to the means for receiving a third signal, for connecting the call to the selected path for communication following receipt of the third signal.

35. The switch of claim 34 wherein the first switch is an end office switch, the second switch is an interexchange-carrier switch, and the call is a domestic call; and wherein the means for transmitting a first signal on a selected communication path leading from the first switch to the second switch comprise means for transmitting a trunk-seizure signal on a selected trunk leading from the end office switch to the interexchange-carrier switch.

36. The switch of claim 34 wherein the means for transmitting call-characterizing information comprise:

means for transmitting a first information sequence, of information characterizing a source of the call; and means, cooperative with the means for transmitting a first information sequence, for transmitting or not a second information sequence, of information characterizing a destination of the call.

37. A first telephone switch for establishing a communication path between the first telephone switch and a second telephone switch for a call originating at the first telephone switch, comprising:

means for seizing a selected trunk connecting the first switch with the second switch;

means, operative subsequently to the means for seizing a selected trunk, for receiving on the selected trunk a first wink following trunk seizure;

means, operative subsequently to the means for receiving a first wink, for transmitting on the selected trunk a first information sequence, of information characterizing a source of the call and identifying or not the source of the call, following receipt of the first wink;

means, cooperative with the means for transmitting a first information sequence, for transmitting or not on the selected trunk a second information sequence, of information identifying a destination of the call;

means, operative subsequently to the means for transmitting a first information sequence, for receiving on the selected trunk an acknowledgment wink acknowledging the first information sequence and, if transmitted, also the second information sequence; and means, operative subsequently to the means for receiving an acknowledgment wink, for cutting-through a call path to the selected trunk following receipt of the acknowledgment wink 38. The switch of claim 37 wherein the first switch is an end office switch, the second switch is an interexchange-carrier switch, and the call is a domestic call; and wherein the means for seizing a selected trunk connecting the first switch with the second switch comprise means for transmitting a trunk-seizure signal on a selected trunk connecting the end office switch with the interexchange-carrier switch.

39. A first telephone switch for establishing a communication path between the first switch and a second telephone switch for a call connected to the first telephone switch, comprising:

means for transmitting a first signal on a selected communication path leading from the first switch to the second switch;

means, operative subsequently to the means for transmitting a first signal, for receiving on the selected path a second signal following transmission of the first signal;

means, operative subsequently to the means for receiving a second signal, for transmitting on the selected path a first set of call-characterizing information following receipt of the second signal;

means, operative subsequently to the means for transmitting a first set of call-characterizing information, for receiving on the selected path a third signal responsive to the first set of call-characterizing information;

means, operative subsequently to the means for receiving a third signal, for transmitting on the selected path a second set of call-characterizing information following receipt of the third signal;

means, operative subsequently to the means for transmitting a second set of call-characterizing information, for receiving on the selected path a fourth signal acknowledging the second set of call-characterizing information; and means, operative subsequently to the means for receiving a fourth signal, for connecting the call to the selected path for communication following receipt of the fourth signal.

40. The switch of claim 39 wherein the first switch is an end office switch, the second switch is an interexchange-carrier switch, and the call is an international call; and wherein the means for transmitting a first signal on a selected communication path leading from the first switch to the second switch comprising means for transmitting a trunk-seizure signal on a selected trunk leading from the end office switch to the interexchange-carrier switch.

41. The switch of claim 39 wherein the first switch is an end office switch and the second switch is an access tandem switch for interfacing the call to an interexchange-carrier switch; and wherein the means for transmitting a first signal on a selected communication path leading from the first switch to the second switch comprise means for transmitting a trunk-seizure signal on a selected trunk leading from the end office switch to the access tandem switch.

42. The switch of claim 39 wherein the means for transmitting a first set of call-characterizing information comprise:

means for transmitting a first information sequence, of information characterizing a route of the call from the second switch to a third switch.

43. The switch of claim 39 wherein the means for transmitting a second set of call-characterizing information comprise:

means for transmitting a second information sequence, of information characterizing a source of the call; and means, cooperative with the means for transmitting a second information sequence, for transmitting a third information sequence, of information characterizing a destination of the call.

44. A first telephone switch for establishing a communication path between the first telephone switch and a second telephone switch for a call originating at the first telephone switch, comprising:

means for seizing a selected trunk connecting the first switch with the second switch;

means, operative subsequently to the means for seizing a selected trunk, for receiving on the selected trunk a first wink following trunk seizure;

means, operative subsequently to the means for receiving a first wink, for transmitting on the selected trunk a first information sequence, of information identifying an interexchange carrier for the call and characterizing a route of the call from the second switch to a switch of the identified carrier, following receipt of the first wink;

means, operative subsequently to the means for transmitting a first information sequence, for receiving on the selected trunk a second wink responsive to the first information sequence;

means, operative subsequently to the means for receiving a second wink, for transmitting on the selected trunk a second information sequence, of information characterizing the call and identifying or not a source of the call, following receipt of the second wink;

means, cooperative with the means for transmitting a second information sequence, for transmitting or not on the selected trunk a third information sequence, of information identifying a destination of the call;

means, operative subsequently to the means for transmitting a second information sequence, for receiving on the selected trunk an acknowledgment wink acknowledging the second information sequence and, if transmitted, also the third information sequence; and means, operative subseqeuntly to the means for receiving an acknowledgment wink, for cutting-through a call path to the selected trunk following receipt of the acknowledgment wink.

45. The switch of claim 44 wherein the first switch is an end office switch, the second switch is an interexchange-carrier switch, and the call is an international call; and wherein the means for seizing a selected trunk connecting the first switch with the second switch comprise means for transmitting a trunk seizure signal on a selected trunk connecting the end office switch with the interexchange-carrier switch.

46. The switch of claim 44 wherein the first switch is an end office switch and the second switch is an access tandem switch for interfacing the call to an interexchange-carrier switch; and wherein the means for seizing a selected trunk connecting the first switch with the second switch comprise means for transmitting a trunk seizure signal on a selected trunk connecting the end office switch with the access tandem switch.

47. A second telephone switch for establishing a communication path between a first telephone switch and the second telephone switch for a call connected to the first telephone switch, comprising:

means for receiving a first signal on a communication path leading from the second switch to the first switch;

means, operative subsequently to the means for receiving a first signal, for transmitting on the path a second signal following receipt of the first signal;

means, operative subsequently to the means for transmitting a second signal, for receiving on the path call-characterizing information, following transmission of the second signal; and means, operative sebsequently to the means for receiving call-characterizing information, for transmitting on the path a third signal acknowledging receipt of the call-characterizing information, to cause connection of the call to the path for communication.

48. The switch of claim 47 wherein the first switch is an end office switch, the second switch is an interexchange-carrier switch, and the call is a domestic call; and wherein the means for receiving a first signal on a communication path leading from the second switch to the first switch comprise means for receiving a trunk-seizure signal on a trunk leading from the interexchange-carrier switch to the end office switch.

49. The switch of claim 47 wherein the first switch is an access tandem switch for interfacing the call to the second switch, the second switch is an interexchange-carrier switch, and the call is a domestic call originating at an end office switch; and wherein the means for receiving a first signal on a communication path leading from the second switch to the first switch comprise means for receiving a trunk-seizure signal on a trunk leading from the interexchange-carrier switch to the access tandem switch.

50. A second telephone switch for establishing a communication path between a first telephone switch and the second telephone switch for a call connected to the first telephone switch, comprising:

means for detecting seizure of a trunk connecting the first switch with the second switch;

means, operative subsequently to the means for detecting seizure, for transmitting on the trunk a first wink following detection of the seizure;

means, operative subsequently to the means for transmitting a first wink, for receiving on the trunk a first information sequence, of information characterizing a source of the call and identifying or not the source of the call, following transmittal of the first wink;

means, cooperative with the means for receiving a first information sequence, for receiving or not on the trunk a second information sequence, of information identifying a destination of the call; and means, operative subsequently to the means for receiving a first information sequence, for transmitting on the trunk an acknowledgment wink acknowledging receipt of the first information sequence and, if received, also the second information sequence, to cause cut-through of a call path to the trunk.

51. The switch of claim 50 wherein the first switch is an originating end office switch, the second switch is an interexchange-carrier switch, and the call is a domestic call; and wherein the means for detecting seizure of a trunk connecting the first switch with the second switch comprise means for receiving a trunk-seizure signal on a trunk connecting the originating end office switch with the interexchange-carrier switch.

52. The switch of claim 50 wherein the first switch is an access tandem switch for interfacing the call to the second switch, the second switch is an interexchange-carrier switch, and the call is a domestic call originating at an end office switch; and wherein the means for detecting seizure of a trunk connecting the first switch with the second switch comprise means for receiving a trunk-seizure signal on a trunk connecting the access tandem switch with the interexchange-carrier switch.

53. A second telephone switch for establishing a communication path between a first telephone switch and the second telephone switch for a call connected to the first telephone switch, comprising:

means for receiving a first signal on a communication path leading from the second switch to the first switch;

means, operative subsequently to the means for receiving a first signal, for transmitting on the path a second signal following receipt of the first signal;

means, operative subsequently to the means for transmitting a second signal, for receiving on the path a first set of call-characterizing information, following transmittal of the second signal;

means, operative subsequently to the means for receiving a first set of call-characterizing information, for transmitting on the path a third signal, following receipt of the first set of call-characterizing information;

means, operative subsequently to the means for transmitting a third signal, for receiving on the path a second set of call-characterizing information, following transmittal of the third signal; and means, operative subsequently to the means for receiving a second set of call-characterizing information, for transmitting on the path a fourth signal acknowledging receipt of the second set of call-characterizing information, to cause connection of the call to the path for communication.

54. The switch of claim 53 wherein the first switch is an end office switch, the second switch is an interexchange-carrier switch, and the call is an international call; and wherein the means for receiving a first signal on a communication path leading from the second switch to the first switch comprise means for receiving a trunk-seizure signal on a trunk leading from the interexchange-carrier switch to the end office switch.

55. The switch of claim 53 wherein the first switch is an access tandem switch for interfacing the call to the second switch, the second switch is an interexchange-carrier switch, and the call is an international call originating at an end office switch; and wherein the means for receiving a first signal on a communication path leading from the second switch to the first switch comprise means for receiving a trunk-seizure signal on a trunk leading from the interexchange-carrier switch to the access tandem switch.

56. A second telephone switch for establishing a communication path between a first telephone switch and the second telephone switch for a call connected to the first telephone switch, comprising:

means for detecting seizure of a trunk connecting the first switch with the second switch;

means, operative subsequently to the means for detecting seizure, for transmitting on the trunk a first wink, following detection of the seizure;

means, operative subsequently to the means for transmitting a first wink, for receiving on the trunk a first information sequence, of information identifying an interexchange carrier for the call and characterizing a route of the call from the second switch to a switch of the identified carrier, following transmittal of the first wink;

means, operative subsequently to the means for receiving a first information sequence, for transmitting on the trunk a second wink, following receipt of the first information sequence;

means, operative subsequently to the means for transmitting a second wink, for receiving on the trunk a second information sequence, of information characterizing a source of the call and identifying or not the source of the call, following transmittal of the second wink;

means, cooperative with the means for receiving a second information sequence, for receiving or not on the trunk a third information sequence, of information identifying a destination of the call; and means, operative subsequently to the means for receiving a second information sequence, for transmitting on the trunk an acknowledgment wink acknowledging receipt of the second information sequence and, if received, also the third information sequence, to cause cut-through of a call path to the trunk.

57. The switch of claim 56 wherein the first switch is an originating end office switch, the second switch is an interexchange-carrier switch, and the call is an international call; and wherein the means for detecting seizure of a trunk connecting the first switch with the second switch comprise means for receiving a trunk-seizure signal on a trunk connecting the end office switch with the interexchange-carrier switch.

58. The switch of claim 56 wherein the first switch is an access tandem switch for interfacing the call to the second switch, the second switch is an interexchange-carrier switch, and the call is an international call originating at an end office switch; and wherein the means for detecting seizure of a trunk connecting the first switch with the second switch comprise means for receiving a trunk-seizure signal on a trunk connecting the access tandem switch with the interexchange-carrier switch.

59. A third telephone switch for establishing a communication path between a first telephone switch and a second telephone switch for a call connected to the first telephone switch, comprising:

means for receiving a first signal on a first communication path leading from the third switch to the first switch;

means, responsive to the means for receiving a first signal, for transmitting on the first path a second signal following receipt of the first signal;

means, responsive to the means for transmitting a second signal, for receiving on the first path a first set of call-characterizing information following transmittal of the second signal;

means, responsive to the means for receiving a first set of call-characterizing information, for transmitting a third signal on a selected second communication path leading from the third switch to the second switch, following receipt of the first set of call-characterizing information;

means, responsive to the means for transmitting a third signal, for receiving on the second path a fourth signal following transmittal of the third signal;

means, responsive to the means for receiving a fourth signal, for connecting the first path to the second path for communication; and means, responsive to the means for receiving a fourth signal, for transmitting on the first path a fifth signal, to cause the first switch to connect the call to the first path for communication following transmittal by the first switch of a second set of call-characterizing information to the second switch and receipt by the first switch of an acknowledgment wink from the second switch.

60. The switch of claim 59 wherein the first switch is an end office switch, the second switch is an interexchange-carrier switch, the third switch is an access tandem switch, and the call is a domestic call;

wherein the means for receiving a first signal on a first communication path leading from the third switch to the first switch comprise means for receiving a trunk-seizure signal on a first trunk leading from the access tandem switch to the end office switch; and wherein the means for transmitting a third signal on a selected second communication path leading from the third switch to the second switch comprise means for transmitting a trunk-seizure signal on a selected second trunk leading from the access tandem switch to the interexchange-carrier switch.

61. A third telephone switch for establishing a communication path between a first telephone switch and a second telephone switch for a call originating at the first telephone switch, comprising:

means for detecting seizure of a first trunk connecting the first switch with the third switch;

means, operative subsequently to the means for detecting seizure, for transmitting on the first trunk a first wink following detection of seizure of the first trunk;

means, operative subsequently to the means for transmitting a first wink, for receiving on the first trunk a first information sequence, of information identifying an interexchange carrier for the call and characterizing a route of the call from the third switch to the second switch, following transmittal of the first wink;

means, operative subsequently to the means for receiving a first information sequence, for seizing a selected second trunk connecting the third switch with the second switch, following receipt of the first information sequence;

means, operative subsequently to the means for seizing a selected second trunk, for receiving on the second trunk a second wink, following seizure of the second trunk;

means, operative subsequently to the means for receiving a second wink, for cutting-through the communication path between the first trunk and the second trunk, following receipt of the second wink; and means, operative subsequently to the means for receiving a second wink, for transmitting a third wink identical to the second wink on the first trunk, to cause the first switch to cut-through a call path to the first trunk following transmittal by the first switch of at least a second information sequence, of call-characterizing information, to the second switch and receipt by the first switch of an acknowledgment wink from the second switch.

62. The switch of claim 61 wherein the first switch is an end office switch, the second switch is an interexchange-carrier switch, the third switch is an access tandem switch, and the call is a domestic call;

wherein the means for detecting seizure of a first trunk connecting the first switch with the third switch comprise means for receiving a trunk-seizure signal on a first trunk connecting the end office switch with the access tandem switch; and wherein the means for seizing a selected second trunk connecting the third switch with the second switch comprise means for transmitting a trunk-seizure signal on a selected second trunk connecting the access tandem switch with the interexchange-carrier switch.

63. A third telephone switch for establishing a communication path between a first telephone switch and a second telephone switch for a call connected to the first telephone switch, comprising:

means for receiving a first signal on a first communication path leading from the third switch to the first switch;

means, operative subsequently to the means for receiving a first signal, for transmitting on the first path a second signal, following receipt of the first signal;

means, operative subsequently to the means for transmitting a second signal, for receiving on the first path a first set of call-characterizing information, following transmittal of the second signal;

means, operative subsequently to the means for receiving a first set of call-characterizing information, for transmitting a third signal on a selected second communication path leading from the third switch to the second switch, following receipt of the first set of call-characterizing information;

means, operative subsequently to the means for transmitting a third signal, for receiving on the second path a fourth signal, following transmittal of the third signal;

means, operative subsequently to the means for receiving a fourth signal, for transmitting the first set of call-characterizing information on the second path;

means, operative subsequently to the means for transmitting the first set of call-characterizing information on the second path, for receiving on the second path a fifth signal responsive to the first set of call-characterizing information;

means, operative subsequently to the means for receiving a fifth signal, for connecting the first path to the second path for communication, following receipt of the fifth signal; and means, operative subsequently to the means for receiving a fifth signal, for transmitting on the first path a sixth signal following receipt of the fifth signal, to cause the first switch to connect the call to the first path for communication following transmittal by the first switch of a second set of call-characterizing information to the second switch and receipt by the first switch of an acknowledgment wink from the second switch.

64. The switch of claim 63 wherein the first switch is an end office switch, the second switch is an interexchange-carrier switch, the third switch is an access tandem switch, and the call is an international call;

wherein the means for receiving a first signal on a first communication path leading from the third switch to the first switch comprise means for receiving a trunk-seizure signal on a first trunk leading from the access tandem switch to the end office switch; and wherein the means for transmitting a third signal on a selected second communication path leading from the third switch to the second switch comprise means for transmitting a trunk-seizure signal on a selected second trunk leading from the access tandem switch to the interexchange-carrier switch.

65. A third telephone switch for establishing a communication path between a first telephone switch and a second telephone switch for a call originating at the first telephone switch, comprising:

means for detecting seizure of a first trunk connecting the first switch with the third switch;

means, operative subsequently to the means for detecting seizure, for transmitting on the first trunk a first wink, following seizure of the first trunk;

means, operative subsequently to the means for transmitting a first wink, for receiving on the first trunk a first information sequence, of information identifying an interexchange carrier for the call and characterizing a route of the call from the third switch to the second switch, following transmittal of the first wink;

means, operative subsequently to the means for receiving a first information sequence, for seizing a selected second trunk connecting the third switch with the second switch, following receipt of the first information sequence;

means, operative subsequently to the means for seizing a selected trunk, for receiving on the second trunk a second wink following seizure of the second trunk;

means, operative subsequently to the means for receiving a second wink, for transmitting on the second trunk the first information sequence, following recipt of the second wink;

means, operative subsequently to the means for transmitting the first information sequence on the second trunk, for receiving on the second trunk a third wink following transmittal of the first information sequence;

means, operative subsequently to the means for receiving a third wink, for cutting-through the communication path between the first trunk and the second trunk, following receipt of the third wink; and means, operative subsequently to the means for receiving a third wink, for transmitting a fourth wink identical to the third wink on the first trunk, to cause the first switch to cut-through a call path to the first trunk following transmittal by the first switch of at least a second information sequence, of call-characterizing information, to the second switch and receipt by the first switch of an acknowledgment wink from the second switch.

66. The switch of claim 65 wherein the first switch is an end office switch, the second switch is an interexchange-carrier switch, the third switch is an access tandem switch, and the call is an international call;

wherein the means for detecting seizure of a first trunk connecting the first switch with the third switch comprise means for receiving a trunk-seizure signal on a first trunk connecting the end office switch with the access tandem switch; and wherein the means for seizing a selected second trunk connecting the third switch with the second switch comprise means for transmitting a trunk-seizure signal on a selected second trunk connecting the access tandem switch with the interexchange-carrier switch.

* * * * *